United States Patent
Yokoyama

(10) Patent No.: US 10,807,517 B2
(45) Date of Patent: Oct. 20, 2020

(54) CONTROLLING DEVICE FOR VEHICLE HEADLIGHT, VEHICLE HEADLIGHT, AND METHOD OF CONTROLLING VEHICLE HEADLIGHT

(71) Applicant: STANLEY ELECTRIC CO., LTD., Tokyo (JP)

(72) Inventor: Koh Yokoyama, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/184,693

(22) Filed: Nov. 8, 2018

(65) Prior Publication Data

US 2019/0143884 A1 May 16, 2019

(30) Foreign Application Priority Data

Nov. 13, 2017 (JP) ................................. 2017-218152

(51) Int. Cl.
*B60Q 1/14* (2006.01)
*B60Q 9/00* (2006.01)
(Continued)

(52) U.S. Cl.
CPC ........ *B60Q 1/143* (2013.01); *B60Q 2300/056* (2013.01); *B60Q 2300/112* (2013.01); *B60Q 2300/42* (2013.01)

(58) Field of Classification Search
CPC .............. B60Q 1/143; B60Q 2300/054; B60Q 2300/112; B60Q 1/14; B60Q 1/44; B60Q 2300/314; B60Q 11/005; B60Q 1/12; B60Q 1/2607; B60Q 1/30; B60Q 1/444; B60Q 1/482; B60Q 2300/052; B60Q 2300/114; B60Q 2300/12; B60Q 2300/122; B60Q 2300/142; B60Q 2300/144; B60Q 2300/312; B60Q 2300/3321;
(Continued)

(56) References Cited

U.S. PATENT DOCUMENTS 6,587,573 B1 * 7/2003 Stam ...................... B60Q 1/085
340/930
2008/0130302 A1 6/2008 Watanabe
(Continued)

FOREIGN PATENT DOCUMENTS

EP 2 388 163 A2 11/2011
EP 2 636 946 A2 9/2013
(Continued)

OTHER PUBLICATIONS

Extended European Search Report for the related European Patent Application No. 18205268.8 dated Apr. 29, 2019.

*Primary Examiner* — Wei (Victor) Y Chan
(74) *Attorney, Agent, or Firm* — Kenealy Vaidya LLP

(57) ABSTRACT

A controlling device for a vehicle headlight that controls a light distribution state by the vehicle headlight, includes a shielding range derivation part that obtains movement information that is information showing movement of an oncoming vehicle and that derives a shielding range of the vehicle headlight on the basis of the obtained movement information, and a light distribution controller that controls the light distribution state of the vehicle headlight according to the shielding range derived by the shielding range derivation part.

5 Claims, 12 Drawing Sheets

TIME T1
FIRST POSITIONAL RELATION

TIME T2
SECOND POSITIONAL RELATION

TIME T3
THIRD POSITIONAL RELATION

(51) Int. Cl.
*B60Q 1/40* (2006.01)
*B60Q 1/42* (2006.01)

(58) Field of Classification Search
CPC .......... B60Q 2300/334; B60Q 2300/41; B60Q 2300/42; B60Q 2400/40; B60Q 2900/10; B60Q 3/00
USPC .......................... 362/101, 191, 249.14, 382
See application file for complete search history.

(56) References Cited

U.S. PATENT DOCUMENTS

| | | | |
|---|---|---|---|
| 2008/0225271 A1* | 9/2008 | Ohmura | B60Q 1/085 356/51 |
| 2011/0267455 A1 | 11/2011 | Gotz et al. | |
| 2014/0169010 A1* | 6/2014 | Imaeda | B60Q 1/143 362/460 |
| 2015/0003087 A1 | 1/2015 | Futamura et al. | |

FOREIGN PATENT DOCUMENTS

| | | |
|---|---|---|
| EP | 3 153 351 A1 | 4/2017 |
| FR | 3 031 480 A1 | 7/2016 |
| JP | 2013-184602 A | 9/2013 |

\* cited by examiner

CONTROLLING DEVICE FOR VEHICLE HEADLIGHT, VEHICLE HEADLIGHT, AND METHOD OF CONTROLLING VEHICLE HEADLIGHT

CROSS-REFERENCE TO RELATED APPLICATION

Priority is claimed on Japanese Patent Application No. 2017-218152, filed Nov. 13, 2017, the content of which is incorporated herein by reference.

BACKGROUND OF THE INVENTION

Field of the Invention

The present invention relates to a controlling device for a vehicle headlight, a vehicle headlight, and a method of controlling vehicle headlight.

Description of Related Art

For example, a vehicle headlight has two facilities, i.e., a traveling beam (a so-called high beam) and a passing beam (a so-called low beam).

In recent years, an adaptive driving beam (ADB) has been developed, and a lamp having a function of blocking light of a portion of a preceding vehicle or an oncoming vehicle present in front of a vehicle and maintaining a region of the traveling beam has been introduced.

In an ADB, when a side in front of the vehicle is captured by a camera and an object to be shielded is detected, a signal is delivered to a light control module (LCM), and a shielding is performed such that light does not reach the object.

In regard to the vehicle headlights, a technology of suppressing a glare to a preceding vehicle is known (for example, see Japanese Unexamined Patent Application, First Publication No. 2013-184602).

In this technology, a lighting control device of a vehicle headlight includes a vehicle detector configured to obtain position information of a preceding vehicle on the basis of an image of a side in front of a host vehicle captured by a camera, a preceding vehicle movement detector configured to detect movement of a preceding vehicle in a leftward/rightward direction when seen from the host vehicle, a shielding range determination part configured to obtain a shielding range of the vehicle headlight on the basis of the position information obtained by the vehicle detector and correct the obtained shielding range of the vehicle headlight according to a relative angle of the preceding vehicle with respect to a direction of the host vehicle when movement of the preceding vehicle in a leftward/rightward direction seen from the host vehicle is detected by the preceding vehicle movement detector, and a light distribution controller configured to control a light radiation state of the vehicle headlight according to the obtained shielding range.

According to this lighting control device, when the preceding vehicle is moving with respect to the host vehicle in the leftward/rightward direction, it is possible to suppress a glare for the preceding vehicle. When a relative angle between a direction of the host vehicle and a direction of the preceding vehicle varies as the preceding vehicle moves in the leftward/rightward direction, a range in which glare is caused for the preceding vehicle when seen from the host vehicle varies. However, it is possible to suppress a glare to the preceding vehicle and it is possible to eliminate an uncomfortable feeling due to glare for a driver or the like in the preceding vehicle by correcting a shielding range according to a relative angle of the preceding vehicle with respect to a direction of the host vehicle (additional correction).

SUMMARY OF THE INVENTION

In the above-mentioned technology, a time is required until light is blocked such that the light does not reach an object to be shielded after a side in front of the vehicle is captured by the camera, and when the light is blocked, there may be no object at the detection position and an object may be present within a range which the light reaches. In this case, when the object is an oncoming vehicle, glare is caused for a driver in the oncoming vehicle.

When an oncoming vehicle is seen from the host vehicle, since the oncoming vehicle is moving at a relative speed, the oncoming vehicle is seen as moving at a higher speed in comparison with the case in which a preceding vehicle is seen from the host vehicle. Accordingly, when light is blocked with respect to the oncoming vehicle, there may be no object at the detection position, and an object is present within a range which light reaches in many cases.

If it is supposed that a shielding range is enlarged by a margin being formed within the shielded range, while glare may not necessarily be caused for the driver in an oncoming vehicle in some cases, controlling the illumination range of the headlight with a high resolution is sacrificed due to increasing the margin.

An aspect of the present invention is directed to providing a controlling device for a vehicle headlight capable of suppressing a glare to a driver in an oncoming vehicle.

A controlling device for a vehicle headlight according to an aspect of the present invention is a controlling device for a vehicle headlight that controls a light distribution state by the vehicle headlight, including: a shielding range derivation part that obtains movement information that is information showing movement of an oncoming vehicle and that derives a shielding range of the vehicle headlight on the basis of the obtained movement information; and a light distribution controller that controls the light distribution state of the vehicle headlight according to the shielding range derived by the shielding range derivation part.

In the aspect of the present invention, the movement information may be calculated from positions of the oncoming vehicle that are detected a plurality of times, and a time for deriving the shielding range of the vehicle headlight on the basis of the obtained movement information may be shorter than an interval of detections of the positions of the oncoming vehicle.

In the aspect of the present invention, a vehicle information acquisition part that obtains an angle formed between an advancing direction of a host vehicle and a line connecting the host vehicle and the oncoming vehicle on the basis of an image of a side in front of the host vehicle captured by a camera may be provided, and the shielding range derivation part may obtain the movement information from the information showing the angle acquired by the vehicle information acquisition part.

In the aspect of the present invention, the vehicle information acquisition part may further acquire information showing a speed of the host vehicle, and the shielding range derivation part may derive the shielding range on the basis of the information showing the angle acquired by the vehicle information acquisition part and the information showing the speed of the host vehicle.

In the aspect of the present invention, a vehicle information acquisition part that acquires information showing an angle formed between the advancing direction of a host vehicle and a line connecting the host vehicle and the oncoming vehicle and a speed of the host vehicle on the basis of an image of a side in front of the host vehicle captured by a camera may be provided, and the shielding range derivation part may obtain the movement information from the information showing the angle acquired by the vehicle information acquisition part, derive a shielding range on the basis of the movement information when the speed of the host vehicle is less than a predetermined threshold, and derive a shielding range on the basis of the information showing the angle acquired by the vehicle information acquisition part and the information showing the speed of the host vehicle when the speed of the host vehicle is equal to the predetermined threshold or more.

In the aspect of the present invention, the shielding range derivation part may store a fixed number table in which a relative speed of the oncoming vehicle with respect to the host vehicle and a shielding range are correlated with each other, derive a relative speed of the oncoming vehicle with respect to the host vehicle on the basis of the information showing the angle acquired by the vehicle information acquisition part and the information showing the speed of the host vehicle, and acquire a shielding range correlated to the derived relative speed.

In the aspect of the present invention, the movement information may be an angular velocity.

A vehicle headlight of another aspect of the present invention is a vehicle headlight including: a shielding range derivation part that obtains movement information that is information showing movement of an oncoming vehicle and derive a shielding range of the vehicle headlight on the basis of the obtained movement information; and a light distribution controller that controls a light distribution state of the vehicle headlight according to the shielding range derived by the shielding range derivation part.

A method of controlling a vehicle headlight that controls a light distribution state by the vehicle headlight according to another aspect of the present invention includes obtaining movement information that is information showing movement of an oncoming vehicle; deriving a shielding range of the vehicle headlight on the basis of the obtained movement information; and controlling the light distribution state of the vehicle headlight according to the shielding range derived through the step of deriving the shielding range.

According to the aspect of the present invention, it is possible to provide a controlling device for a vehicle headlight capable of suppressing a glare to a driver in an oncoming vehicle.

DETAILED DESCRIPTION OF THE INVENTION

Figure 1:
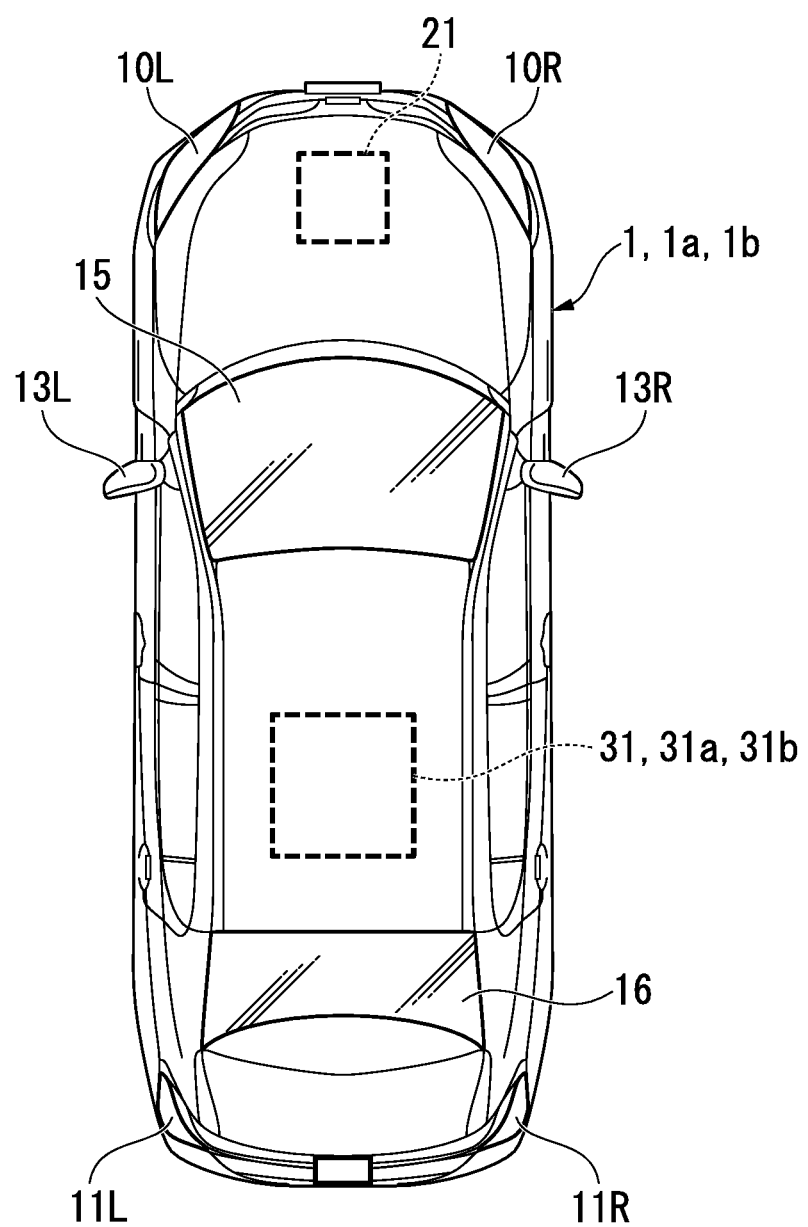
FIG. 1 is a view showing a schematic configuration of an automobile according to an embodiment of the present invention.

Next, a controlling device for a vehicle headlight according to the embodiment will be described with reference to the accompanying drawings. The embodiment described below is merely an example, and the embodiment to which the present invention is applied is not limited to the following embodiment.

Further, in all of the drawings for describing the embodiment, the same reference numerals designate components having the same functions, and repeated descriptions thereof will be omitted.

In addition, "based on XX" disclosed in the application means "based on at least XX," and also includes a case based on another component in addition to XX. In addition, "based on XX" is not limited to a case in which XX is directly used and also includes a case based on the fact that calculation or processing is performed with respect to XX.

"XX" is an arbitrary component (for example, arbitrary information).

Hereinafter, the embodiment of the present invention will be described with reference to the accompanying drawings.

First Embodiment

A controlling device for a vehicle headlight according to the embodiment is mounted on a vehicle. In the embodiment, while an automobile is exemplified as an example of the vehicle, a motorcycle, a bicycle, an ultra-small mobility device, a personal mobility device, or the like, may be the vehicle.

[Schematic Configuration of Automobile]

FIG. 1 is view showing a schematic configuration of an automobile 1 according to an embodiment of the present invention.

The automobile 1 includes a headlight on a left side (in the embodiment, referred to as a left headlight section 10L), a headlight on a right side (in the embodiment, referred to as a right headlight section 10R), a tail light on a left side (in the embodiment, referred to as a left tail light section 11L), a tail light on a right side (in the embodiment, referred to as a right tail light section 11R), a side mirror on a left side (in the embodiment, referred to as a left side mirror 13L), a side mirror on a right side (in the embodiment, referred to as a right side mirror 13R), a front window 15, and a rear window 16.

The left headlight section 10L is disposed on a left side at the front of the automobile 1, and the right headlight section 10R is disposed on a right side at the front of the automobile 1.

The left tail light section 11L is disposed on a left side at the rear of the automobile 1, and the right tail light section 11R is disposed on a right side at the rear of the automobile 1.

In addition, the automobile 1 includes a vehicle surroundings detector on a front side (in the embodiment, referred to as a vehicle front surroundings detector 21), and a controller 31.

Here, in the embodiment, while a portion of constituent parts of the automobile 1 is shown, for example, in addition thereto, arbitrary constituent parts such as another configuration part included in a conventional automobile may be provided.

In addition, either or both of the vehicle front surroundings detector 21 and the controller 31 may be provided in the automobile 1 without being able to be seen from an appearance of the automobile 1.

In addition, a vehicle detection (image processing) part may be provided in the vehicle front surroundings detector 21.

Figure 2:
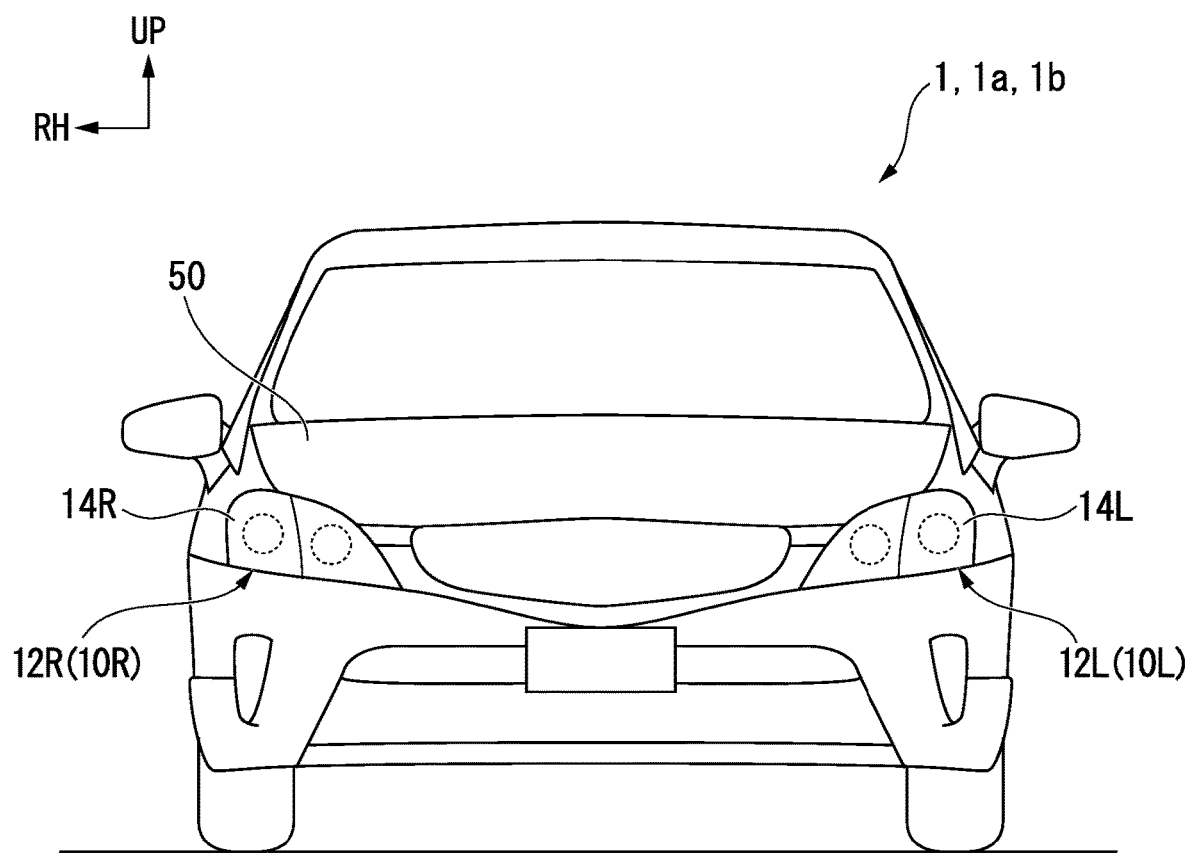
FIG. 2 is a view showing a front portion of the automobile to which a lighting system according to the embodiment of the present invention is applied.

FIG. 2 is a view showing a front portion of the automobile 1 to which a lighting system according to the embodiment of the present invention is applied.

As shown in FIG. 2, the left headlight section 10L includes a headlight unit 12L on a left side. The headlight unit 12L on a left side is disposed on a left end portion of a front end portion of the automobile 1.

In addition, the right headlight section 10R includes a headlight unit 12R on a right side. The headlight unit 12R on a right side is disposed on a right end portion of a front end portion of the automobile 1.

In addition, a front end portion of a hood 50 configured to open and close an engine compartment of the automobile 1 is disposed above the headlight unit 12R and the headlight unit 12L. Further, the headlight unit 12R and the headlight unit 12L are configured laterally symmetrically in a vehicle width direction.

The headlight unit 12L includes a left headlight 14L that constitutes an outer portion of the headlight unit 12L in the vehicle width direction.

The headlight unit 12R includes a right headlight 14R that constitutes an outer portion of the headlight unit 12R in the vehicle width direction.

The left headlight 14L and the right headlight 14R have light sources (not shown), and a side in front of the automobile 1 is illuminated with light from the light sources. The light sources are constituted as light sources for a high beam.

Alternatively, the light sources may be constituted as light sources for a low beam and a high beam. That is, the left headlight 14L and the right headlight 14R may be configured to be switchable to either one of a low beam that mainly illuminates a road surface region (a low beam light distribution area) in front of the automobile 1, and a high beam that illuminates a region (a high beam light distribution area) higher than a region illuminated with the low beam. Further, light emitting diodes (LED), halogen lamps, discharge lamps, lasers, or the like, may be used as light sources of the left headlight 14L and the right headlight 14R.

[Schematic Functional Configuration of Control System of Automobile]

Figure 3:
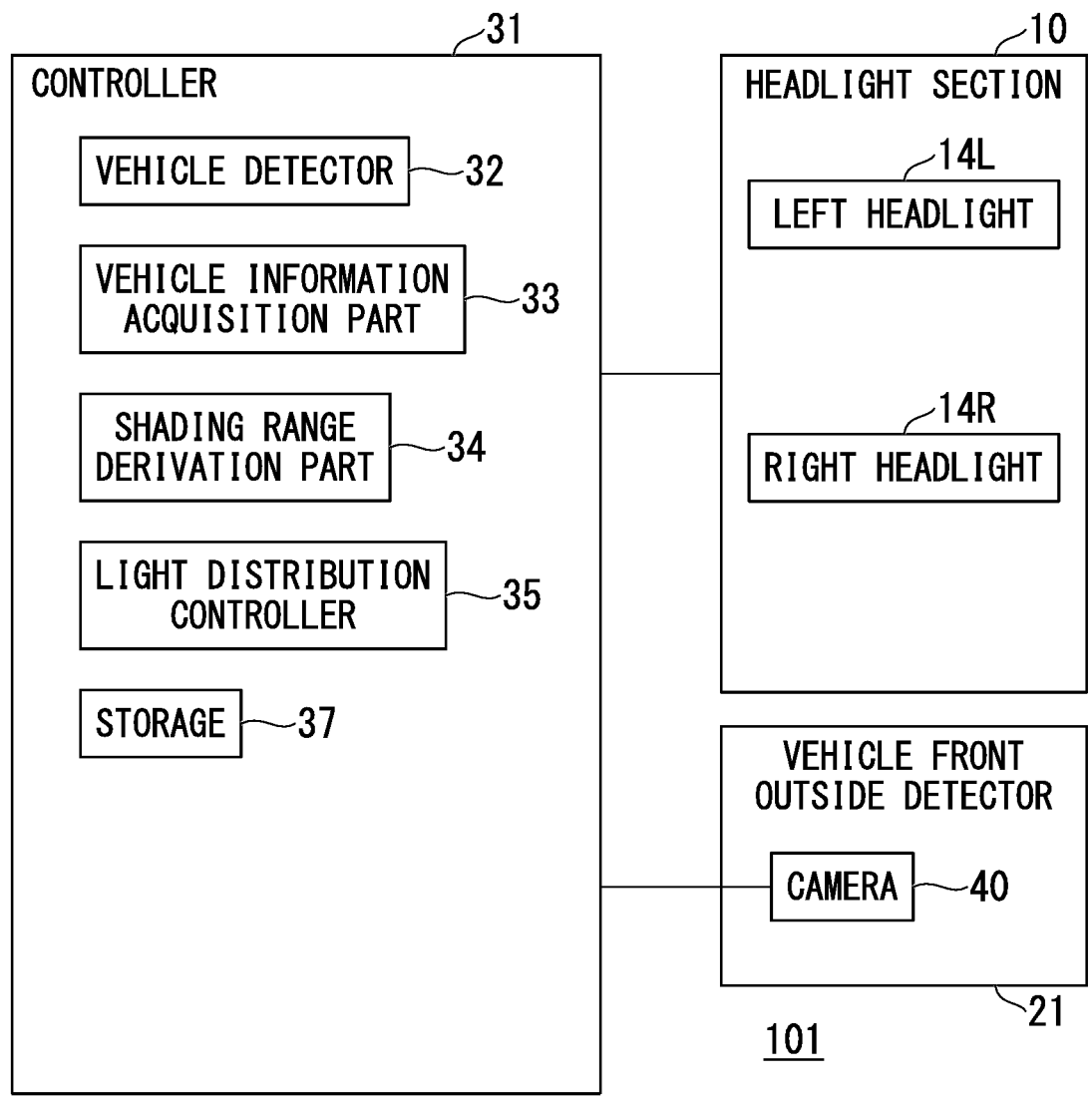
FIG. 3 is a functional block diagram showing a schematic functional configuration of a lighting system included in the automobile according to the embodiment of the present invention.

FIG. 3 is a functional block diagram showing a schematic functional configuration of a lighting system 101 included in the automobile 1 according to the embodiment of the present invention.

The lighting system 101 includes a headlight section 10, the controller 31 and the vehicle front surroundings detector 21.

Here, in the embodiment, similarly to the general concept of "forward and backward," a direction in which the automobile 1 normally advances (travels) in a direction in which a driver in the automobile 1 conventionally faces is referred to as "ahead (forward)" and a direction opposite thereto is referred to as "behind (rearward)."

The headlight section 10 is a so-called headlamp and illuminates light to a side in front of the automobile 1.

The left headlight 14L illuminates light mainly to a left side in front of the automobile 1. The left headlight 14L has a function of radiating light of a traveling beam (a so-called high beam) and a function of radiating light of a passing beam (a so-called low beam), and the two functions can be switched between.

The right headlight 14R illuminates light mainly to a right side in front of the automobile 1. The right headlight 14R has a function of radiating light of a traveling beam (a so-called high beam) and a function of radiating light of a passing beam (a so-called low beam), and the two functions can be switched between.

Further, the left headlight 14L and the right headlight 14R may use arbitrary headlamps, respectively.

As a specific example, a lamp of a traveling beam as a headlamp may use one or more of, for example, a micro electro mechanical systems (MEMS) laser scanning headlamp, a digital mirror device (DMD) headlamp, a matrix ADB headlamp that enables control of columns and rows, an ADB headlamp that enables control of columns only, and so on.

Here, for example, the MEMS laser scanning headlamp is an example of a headlamp for a vehicle that can variably change a light distribution and an example of a seamless ADB lamp.

The vehicle front surroundings detector 21 detects information related to the surroundings an outer side in front of the automobile 1. In the embodiment, while the automobile 1 includes the vehicle front surroundings detector 21, the automobile 1 may include a vehicle rear surroundings detector as another configuration example.

In addition, as another configuration example, the automobile 1 may include a vehicle surroundings detector configured to detect information related to lateral surroundings of the automobile 1 (in the embodiment, referred to as "a vehicle lateral surroundings detector"). As the vehicle lateral surroundings detector, for example, a vehicle lateral surroundings detector on a right side of the automobile 1 in an advancing direction and a vehicle lateral surroundings detector on a left side of the automobile 1 in the advancing direction may be used.

The vehicle front surroundings detector 21 may include a detector configured to detect arbitrary information related to front surroundings of the vehicle. The vehicle front surroundings detector 21 may include one or more of, for example, a light detection and ranging (LiDAR) device, a radar, a sonar, a camera (an imaging apparatus) 40, and so on.

For example, the camera 40 or the like may have a function of detecting visible light, a function of detecting infrared light, or both of these. In the embodiment, description will be continued with a case in which the vehicle front surroundings detector 21 includes the camera 40. The camera 40 is installed at a predetermined position on the automobile 1 (for example, in the vicinity of the interior rearview mirror) and photographs an area in front of the host vehicle.

The controller 31 includes a vehicle detector 32, a vehicle information acquisition part 33, a shielding range derivation part 34, a light distribution controller 35 and a storage 37. Further, in the example, the vehicle detector 32 is included in the controller 31 but may be provided in the vehicle front surroundings detector 21.

The storage 37 stores information. Here, the storage 37 may store arbitrary information. As an example, the storage 37 may store information such as a control program executed by the controller 31, control parameters, or the like. In this case, the controller 31 may include a processor such as a central processing part (CPU) or the like, and the processor may execute various types of processing by executing the control program stored in the storage 37 using the control parameters stored in the storage 37.

The vehicle detector 32 detects an oncoming vehicle on the basis of an image of a side in front of the automobile 1 periodically captured by the camera 40. Specifically, the vehicle detector 32 detects an oncoming vehicle by recognizing a pair of points on the oncoming vehicle through image recognition processing with respect to the image. An example of the pair of points may be exemplified as headlamps (the left headlight 14L and the right headlight 14R) of the oncoming vehicle.

The vehicle detector 32 outputs a pair of recognition results for the oncoming vehicle to the vehicle information acquisition part 33 when an oncoming vehicle is detected. Here, an example of the pair of recognition results for the oncoming vehicle may be exemplified as a pair of images for the oncoming vehicle.

The vehicle information acquisition part 33 obtains positions (relative positions) of the pair of points on the oncoming vehicle that are seen from a reference point on the automobile 1 on the basis of recognition results for the pair of points on the oncoming vehicle output from the vehicle detector 32. Here, an example of the reference point on the automobile 1 is a predetermined position on the automobile 1 (for example, in the vicinity of the interior rearview mirror).

Specifically, a case in which an angle formed between an advancing direction which passes through a center of the automobile 1 when the automobile 1 detects an oncoming vehicle and a line that connects the center of the automobile 1 and a left headlamp of the oncoming vehicle 2 is defined as an angle $\alpha$, and an angle formed between the advancing direction which passes through the center of the automobile 1 and a line that connects the center of the automobile 1 and the right headlamp of the oncoming vehicle 2 is defined as an angle $\beta$ will be described.

The vehicle information acquisition part 33 obtains a position (angles ($\alpha 1$, $\beta 1$)) from an image in front of the automobile 1 captured by the camera 40 when the oncoming vehicle is disposed at a first position. The vehicle information acquisition part 33 outputs information showing the obtained positions (the angles ($\alpha 1$, $\beta 1$)) to the shielding range derivation part 34.

In addition, the vehicle information acquisition part 33 obtains a position (angles ($\alpha 2$, $\beta 2$)) from an image of a side in front of the automobile 1 captured by the camera 40 when the oncoming vehicle moves to be disposed at a second position. The vehicle information acquisition part 33 outputs information showing the obtained positions (the angles ($\alpha 2$, $\beta 2$)) to the shielding range derivation part 34.

The shielding range derivation part 34 obtains a positional relationship between the automobile 1 and the oncoming vehicle 2 on the basis of the information showing the position (the angles) output from the vehicle information acquisition part 33 and obtains a shielding range of the vehicle headlight on the basis of the obtained positional relation.

Specifically, the shielding range derivation part 34 obtains a positional relation between the automobile 1 and the oncoming vehicle 2 on the basis of the information showing the positions (the angles ($\alpha 1$, $\beta 1$)) output from the vehicle information acquisition part 33 and obtains a shielding range of the vehicle headlight on the basis of the obtained positional relation. In addition, the shielding range derivation part 34 obtains a positional relation between the automobile 1 and the oncoming vehicle 2 on the basis of the information showing the positions (the angles ($\alpha 2$, $\beta 2$)) output from the vehicle information acquisition part 33 and obtains a shielding range of the vehicle headlight on the basis of the obtained positional relation.

Figure 4:
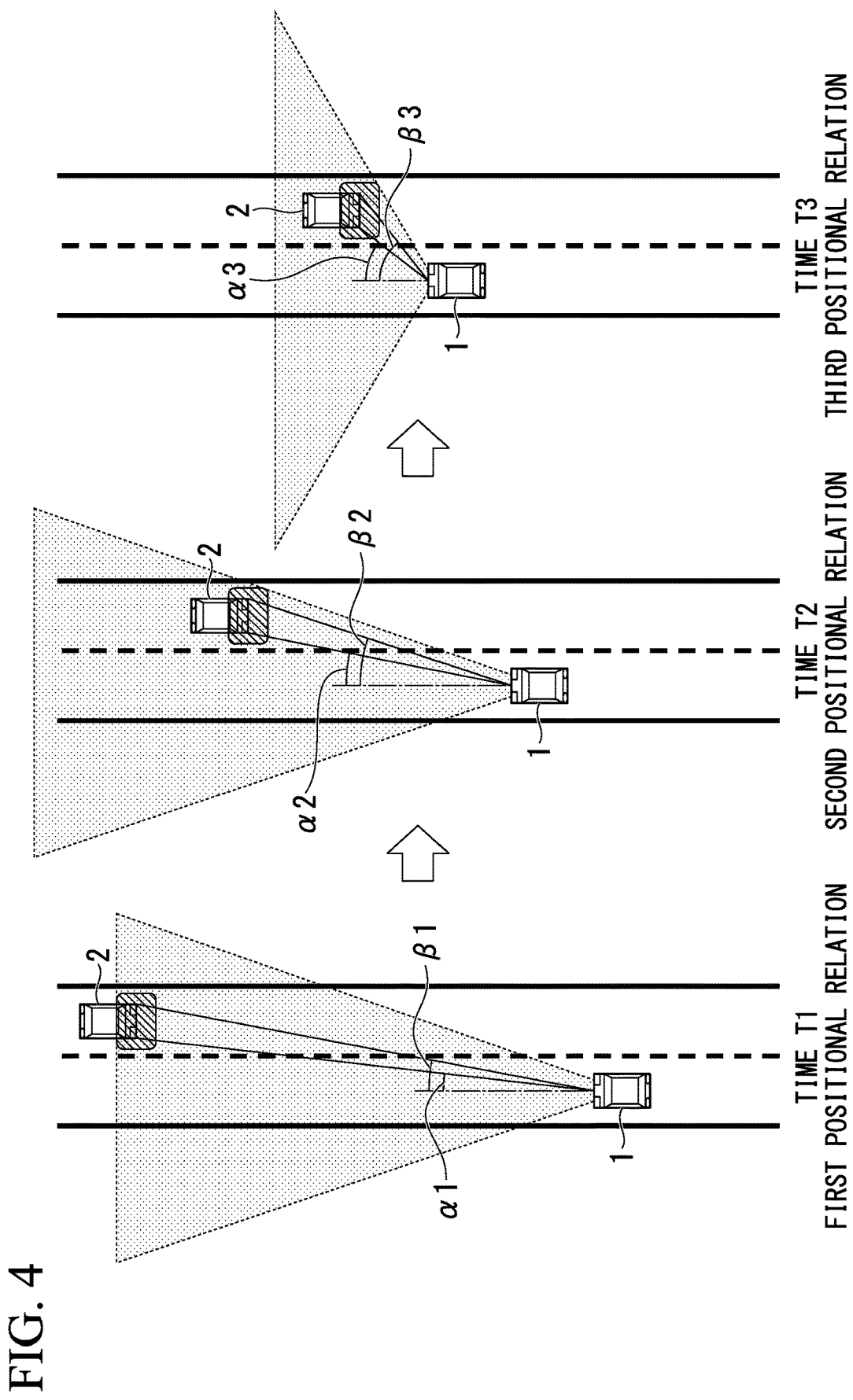
FIG. 4 is a view showing an example of processing for controlling a schematic shielding range of the lighting system included in the automobile according to the embodiment of the present invention.

FIG. 4 is a view for explaining processing for controlling a schematic shielding range of the lighting system 101 included in the automobile 1 according to the embodiment of the present invention.

In FIG. 4, a left side shows a positional relation between the automobile 1 and the oncoming vehicle 2 at a time T1, a middle shows a positional relation between the automobile 1 and the oncoming vehicle 2 at a time T2, and a right side shows a positional relation between the automobile 1 and the oncoming vehicle 2 at a time T3.

In the left side of FIG. 4, an angle formed between an advancing direction which passes through a center of the automobile 1 when the automobile 1 detects the oncoming vehicle 2 and a line connecting the center of the automobile 1 and the left headlamp of the oncoming vehicle 2 is defined as the angle $\alpha 1$, and an angle formed between the advancing direction which passes through the center of the automobile 1 and a line connecting the center of the automobile 1 and the right headlamp of the oncoming vehicle 2 is defined as the angle $\beta 1$.

In the middle of FIG. 4, an angle formed between the advancing direction which passes through the center of the automobile 1 when the automobile 1 detects the oncoming vehicle 2 and a line connecting the center of the automobile 1 and the left headlamp of the oncoming vehicle 2 is defined as the angle $\alpha 2$, and an angle formed between the advancing direction which passes through the center of the automobile 1 and a line connecting the center of the automobile 1 and the right headlamp of the oncoming vehicle 2 is defined as the angle $\beta 2$.

In the right side of FIG. 4, an angle formed between the advancing direction which passes through the center of the automobile 1 when the automobile 1 detects the oncoming vehicle 2 and a line connecting the center of the automobile 1 and the left headlamp of the oncoming vehicle 2 is defined as an angle α3, and an angle formed between the advancing direction which passes through the center of the automobile 1 and a line connecting the center of the automobile 1 and the right headlamp of the oncoming vehicle 2 is defined as an angle β3.

The shielding range derivation part 34 obtains a positional relation between the automobile 1 and the oncoming vehicle 2 on the basis of the information showing the positions (the angles (α1, β1)) output from the vehicle information acquisition part 33 and obtains a shielding range of the vehicle headlight on the basis of the obtained positional relationship at the time T1. The shielding range derivation part 34 obtains a positional relation between the automobile 1 and the oncoming vehicle 2 on the basis of the information showing the positions (the angles (α2, β2)) output from the vehicle information acquisition part 33 and obtains a shielding range of the vehicle headlight on the basis of the obtained positional relation at the time T2.

Processing performed by the shielding range derivation part 34 at the time T3 after a predetermined time has elapsed after the time T2 will be described.

Here, an angular velocity is obtained by dividing an angular difference by a time. A time required until control of a shielding range is performed after the camera 40 photographs a side in front of the automobile 1 is assumed as the time t1.

The shielding range derivation part 34 derives an angular velocity ωLT2 on a left side and an angular velocity ωRT2 on a right side at the time T2 from the angle α1, the angle β1, the angle α2 and the angle β2 from the following Equation (1) and Equation (2).

$$\omega LT2=(\alpha 2-\alpha 1)/t \qquad (1)$$

$$\omega RT2=(\beta 2-\beta 1)/t \qquad (2)$$

The shielding range derivation part 34 stores information showing the angular velocity ωLT2 of a left end and information showing the angular velocity ωRT2 of the right headlamp, which have been derived.

In addition, the shielding range derivation part 34 derives the angle α3 and the angle β3 and derives a shielding range on the basis of the angle α2 and the angle β2, and the angular velocity ωLT2 of the left end and the angular velocity ωRT2 of the right headlamp, which have been derived. The shielding range derivation part 34 outputs the information showing the derived shielding range to the light distribution controller 35.

The light distribution controller 35 acquires information showing the shielding range output from the shielding range derivation part 34 and controls light radiation states of the left headlight 14L and the right headlight 14R of the headlight section 10 (the left headlight 14L and the right headlight 14R) according to the acquired information showing the shielding range. For example, the light distribution controller 35 may set a light distribution pattern according to the shielding range, and outputs control signals to the left headlight 14L and the right headlight 14R such that light is illuminated according to the set light distribution pattern.

Specifically, the light distribution controller 35 controls a light distribution of the headlight section 10 (the left headlight 14L and the right headlight 14R) by controlling radiation of light using the headlight section 10 (the left headlight 14L and the right headlight 14R) (image processing, LD control calculation, MEM control calculation, or the like).

Here, for example, the light distribution controller 35 controls a light distribution when the headlight section 10 (the left headlight 14L and the right headlight 14R) is turned on.

Here, description will be continued with a time required for processing by software being assumed to be t2. The shielding range derivation part 34 derives the angle α3 of the left end and the angle β3 of the right headlamp at the time T3 using the information showing the angular velocity ωLT2 of the left end and the information showing the angular velocity ωRT2 of the right headlamp using Equation (3) and Equation (4), which have been stored.

$$\alpha 3=\alpha 2+\omega LT2\times t2^2 \qquad (3)$$

$$\beta 3=\beta 2+\omega RT2\times t2^2 \qquad (4)$$

The shielding range derivation part 34 stores the information showing the angle α3 of the left end and the angle β3 of the right headlamp, which have been derived.

In addition, the shielding range derivation part 34 derives a shielding range on the basis of the angle α3 of the left end and the angle β3 of the right headlamp, which have been derived. The shielding range derivation part 34 outputs the information showing the derived shielding range to the light distribution controller 35.

The light distribution controller 35 acquires the information showing the shielding range output from the shielding range derivation part 34, and controls light radiation states of the left headlight 14L and the right headlight 14R of the headlight section 10 (the left headlight 14L and the right headlight 14R) according to the information showing the acquired shielding range. For example, the light distribution controller 35 may set a light distribution pattern according to the shielding range, and outputs control signals to the left headlight 14L and the right headlight 14R such that light is illuminated according to the set light distribution pattern.

Specifically, the light distribution controller 35 controls a light distribution of the headlight section 10 (the left headlight 14L and the right headlight 14R) by controlling radiation of light by the headlight section 10 (the left headlight 14L and the right headlight 14R).

Here, for example, the light distribution controller 35 controls a light distribution when the headlight section 10 (the left headlight 14L and the right headlight 14R) is turned on.

[Example of Procedure of Adjustment Processing of Shielding Range]

Figure 5:
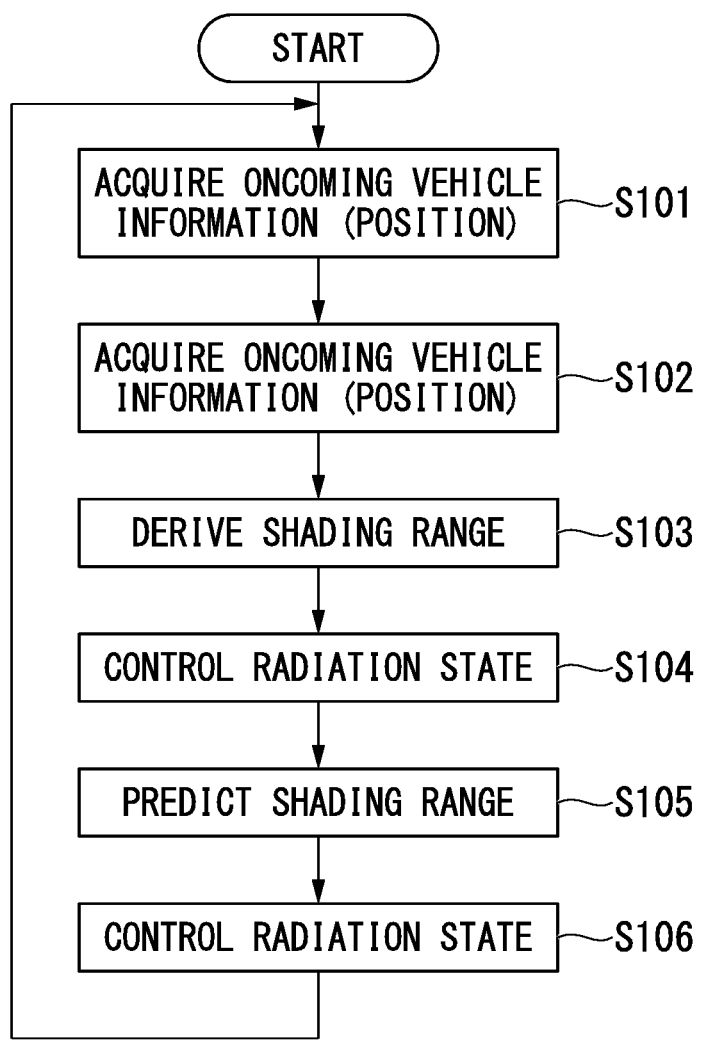
FIG. 5 is a flowchart showing an example of a procedure of processing for controlling a shielding range of the lighting system included in the automobile according to the embodiment of the present invention.

FIG. 5 is a flowchart showing an example of a procedure of processing for controlling a shielding range of the lighting system 101 included in the automobile 1 according to the embodiment of the present invention.

Figure 6:
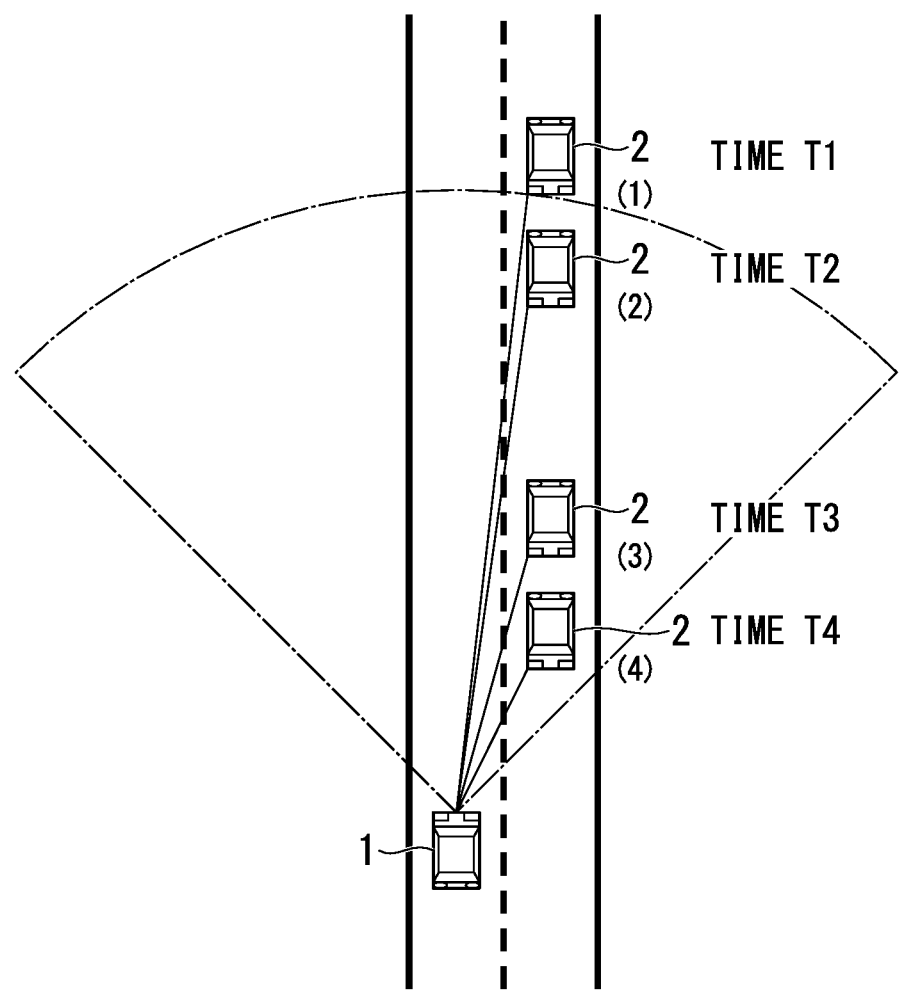
FIG. 6 is a view showing an example of a procedure of processing for controlling a shielding range of the lighting system included in the automobile according to the embodiment of the present invention.

FIG. 6 is a view showing an example of a procedure of processing for controlling a shielding range of the lighting system 101 included in the automobile 1 according to the embodiment of the present invention.

In the example, it is assumed that a certain person as a driver sits on a driver's seat of the automobile 1. In the example, traveling of both of the automobile 1 and the oncoming vehicle 2 is shown as a relative position on the oncoming vehicle 2 with respect to the automobile 1.

Specifically, as shown in FIG. 6, the oncoming vehicle 2 is disposed at position (1) with respect to the automobile 1 on a time T1, the oncoming vehicle 2 is disposed at position (2) with respect to the automobile 1 on a time T2, the oncoming vehicle 2 is disposed at position (3) with respect to the automobile 1 on a time T3, and the oncoming vehicle 2 is disposed at position (4) with respect to the automobile 1 on a time T4.

In the example, processing performed by the shielding range derivation part 34 at the time T3 will be mainly described.

(Step S101)

The vehicle detector 32 detects the oncoming vehicle 2 on the basis of the image of the side in front of the automobile 1 disposed at position (1) captured by the camera 40 at the time T1. The vehicle detector 32 outputs a pair of recognition results for the oncoming vehicle 2 to the vehicle information acquisition part 33 when the oncoming vehicle 2 is detected.

The vehicle information acquisition part 33 obtains positions (angles) of the pair of points on the oncoming vehicle 2 seen from the reference point on the automobile 1 on the basis of the recognition results of the pair of points on the oncoming vehicle 2 detected by the vehicle detector 32. The vehicle information acquisition part 33 outputs the positions (the angles ($\alpha$1, $\beta$1)) of the pair of points on the oncoming vehicle 2 seen from the reference point on the automobile 1, which have been obtained, to the shielding range derivation part 34.

At the time T1, the shielding range derivation part 34 obtains a positional relation between the automobile 1 and the oncoming vehicle 2 on the basis of the information showing the positions (the angles ($\alpha$1, $\beta$1)) output from the vehicle information acquisition part 33 and obtains a shielding range of the vehicle headlight based on the obtained positional relation. The shielding range derivation part 34 stores the information showing the positions (the angles ($\alpha$1, $\beta$1)).

(Step S102)

At the time T2, the vehicle detector 32 detects the oncoming vehicle 2 on the basis of the image of the side in front of the automobile 1 disposed at position (2) captured by the camera 40. The vehicle detector 32 outputs the pair of recognition results for the oncoming vehicle 2 to the vehicle information acquisition part 33 when the oncoming vehicle 2 is detected.

The vehicle information acquisition part 33 obtains positions (angles) of the pair of points on the oncoming vehicle seen from the reference point on the automobile 1 on the basis of the recognition results of the pair of points on the oncoming vehicle 2 detected by the vehicle detector 32. The vehicle information acquisition part 33 outputs the positions (the angles ($\alpha$2, $\beta$2)) of the pair of points on the oncoming vehicle 2 seen from the reference point on the automobile 1, which have been obtained, to the shielding range derivation part 34.

(Step S103)

At the time T2, the shielding range derivation part 34 obtains a positional relation between the automobile 1 and the oncoming vehicle 2 on the basis of the information showing the positions (the angles ($\alpha$2, $\beta$2)) output from the vehicle information acquisition part 33 and obtains a shielding range of the vehicle headlight on the basis of the obtained positional relation. The shielding range derivation part 34 outputs the information showing the obtained shielding range to the light distribution controller 35. The shielding range derivation part 34 stores the information showing the positions (the angles ($\alpha$2, $\beta$2)).

(Step S104)

The light distribution controller 35 acquires information showing the shielding range output from the shielding range derivation part 34, and controls light radiation states of the left headlight 14L and the right headlight 14R of the headlight section 10 (the left headlight 14L and the right headlight 14R) according to the acquired information showing the shielding range.

(Step S105)

At the time T3, the shielding range derivation part 34 derives the angular velocity $\omega$LT2 of the left headlamp and the angular velocity $\omega$RT2 of the right headlamp on the basis of the stored information showing the positions (the angles ($\alpha$1, $\beta$1, $\alpha$2, $\beta$2)). The shielding range derivation part 34 derives the shielding range on the basis of the angular velocity $\omega$LT2 of the left headlamp and the angular velocity $\omega$RT2 of the right headlamp, which have been derived. The shielding range derivation part 34 outputs the information showing the derived shielding range to the light distribution controller 35.

Specifically, the shielding range derivation part 34 derives the angle $\alpha$3 of the left headlamp and the angle $\beta$3 of the right headlamp in the oncoming vehicle 2 disposed at position (3) on the basis of the information showing the angular velocity $\omega$LT2 of the left headlamp and the angular velocity $\omega$RT2 of the right headlamp, which have been derived. The shielding range derivation part 34 derives the shielding range on the basis of the angle $\alpha$3 of the left headlamp and the angle $\beta$3 of the right headlamp, which have been derived. The shielding range derivation part 34 outputs the information showing the derived shielding range to the light distribution controller 35.

(Step S106)

The light distribution controller 35 acquires the information showing the shielding range output from the shielding range derivation part 34, and controls the light radiation states of the left headlight 14L and the right headlight 14R of the headlight section 10 (the left headlight 14L and the right headlight 14R) according to the acquired information showing the shielding range.

After processing of step S106 is terminated, the processing transitions to step S101. In step S101, processing for controlling the shielding range is performed at the time T4.

The above-mentioned first embodiment is not limited to the example described as a case in which processing of causing the lighting system 101 to derive the angles ($\beta$3, $\beta$3) on the basis of the angles ($\alpha$2, $\beta$2), and the angular velocity $\omega$LT2 of the left headlamp and the angular velocity $\omega$RT2 of the right headlamp, which have been derived, and performing an estimation of the shielding range on the basis of the derived angles ($\beta$3, $\beta$3) for a single time.

For example, the lighting system 101 may estimate the shielding range twice or more on the basis of the obtained position (angle), and the angular velocity of the left headlamp and the angular velocity of the right headlamp, which have been derived. In the example shown in FIG. 5, the case in which the shielding range derivation part 34 performs control of the shielding range at the time T3 using the control result of the shielding range at the time T1 and the control result of the shielding range at the time T2, and control of the shielding range at the time T4 is performed without using the previous control results of the shielding range, has been described. However, the shielding range derivation part 34 may perform the control of the shielding range at the time T4 using the control result of the shielding range at the time T2 and the control result of the shielding range at the time T3.

In the above-mentioned first embodiment, while the case in which the shielding range derivation part 34 controls the shielding range on the basis of the image of the side in front of the automobile 1 captured by the camera 40 has been described, there is no limitation thereto. For example, a radar that can detect an oncoming vehicle may be provided in the automobile 1, and the shielding range derivation part 34 may detect vehicle information using the information output from the radar. In the embodiment, while the angular velocity has been calculated, it may be a speed. In addition, while the headlamp position on an oncoming vehicle may be a reference, there is no limitation to the reference and it may be a center of an oncoming vehicle.

In the above-mentioned first embodiment, while the case in which the shielding range of the oncoming vehicle is controlled has been described, there is no limitation to this example. For example, the embodiment is not limited to an oncoming vehicle and it may be applied to a preceding vehicle that is traveling on the same lane or a neighboring lane. In addition, for example, the embodiment may be applied to a following vehicle. In this case, a vehicle surroundings detector configured to detect directions thereof is provided.

According to the lighting system 101 of the above-mentioned first embodiment, the angular velocity at the time T2 is derived on the basis of the vehicle information such as the position (angle) or the like of the oncoming vehicle disposed at position (1) at the time T1, and the vehicle information such as the position (angle) of the oncoming vehicle disposed at position (2) at the time T2. The lighting system 101 obtains information (position information) showing a position on the oncoming vehicle such as angles or the like used when the next shielding range in which a predetermined time has elapsed is derived on the basis of the position (angles) of the oncoming vehicle disposed at position (2) and the derived angular velocity.

According to the above-mentioned configuration, an angular velocity is obtained from the vehicle information when the oncoming vehicle is detected, the obtained angular velocity and the stored vehicle information are reflected in the positioning control of the shielding range, and the position on the shielding range can be moved. The angular velocity can be derived without using the image of the side in front of the automobile 1 captured by the camera 40.

Since a time required until light is blocked such that the light does not reach an object to be shielded after the side in front of the automobile 1 is captured by the camera 40 can be shortened, a situation in which when the light is blocked, there is no object at the detection position, and the object is present in a range which the light reaches can be prevented. A light distribution that does not give glare to the oncoming vehicle is formed in consideration of a delay due to a speed of communication with the camera and an image processing speed, and this can contribute to safety without compromising the view of the driver in the oncoming vehicle.

As described above, a new shielding range is calculated from only the stored vehicle information (the angular velocity, the speed) without using a new measurement result due to vehicle front surroundings detection (the camera 40, the radar), and processing of performing a change of an irradiation state is incorporated therein. Accordingly, the shielding range can be switched at time intervals shorter than in processing of the information by the vehicle front surroundings detector at respective times.

When a communication period between the camera 40 and the controller 31 is assumed to have a maximum tp [s], as the image obtained through photographing by the camera 40 is not used, i.e., as the shielding range is estimated (derived) on the basis of the angle or angular velocity, which has been previously obtained, since a time required for communication between the camera 40 and the controller 31 can be reduced, the maximum tp [s] can be reduced. That is, the movement information (the angular velocity) is calculated from positions of the oncoming vehicle, which are detected a plurality of times, and a time for deriving the shielding range of the vehicle headlight on the basis of the obtained movement information is shorter than intervals between detection of the position on the oncoming vehicle.

Configuration Example

As a configuration example, there is provided a controlling device for a vehicle headlight (in the example, the controller 31 of the lighting system 101) configured to control a light distribution state by a vehicle headlight (in the embodiment, the headlight section 10 (the left headlight 14L and the right headlight 14R), the controlling device for a vehicle headlight (in the example, the controller 31 of the lighting system 101) including a shielding range derivation part configured to obtain movement information (in the example, an angular velocity) that is information showing movement of an oncoming vehicle and derive a shielding range of the vehicle headlight on the basis of the obtained movement information, and a light distribution controller configured to control a light distribution state of the vehicle headlight according to the shielding range derived by the shielding range derivation part.

As a configuration example, in the controlling device for a vehicle headlight, movement information is calculated from positions of an oncoming vehicle that are detected a plurality of times, and a time for deriving a shielding range of the vehicle headlight on the basis of the obtained movement information is shorter than in an interval of detection of the position on the oncoming vehicle.

As a configuration example, in the controlling device for a vehicle headlight, a vehicle information acquisition part (in the example, the vehicle information acquisition part 33 of the lighting system 101) configured to obtain an angle formed between an advancing direction of a host vehicle and a line connecting the host vehicle and the oncoming vehicle on the basis of an image of a side in front of the host vehicle captured by a camera is provided, and the shielding range derivation part obtains movement information from the information showing the angle acquired by the vehicle information acquisition part.

As a configuration example, in the controlling device for a vehicle headlight, the movement information is an angular velocity.

As a configuration example, there is provided a vehicle headlight (in the embodiment, the headlight section 10 (the left headlight 14L and the right headlight 14R), the vehicle headlight including a shielding range derivation part configured to obtain movement information (in the example, an angular velocity) that is information showing movement of an oncoming vehicle and derive a shielding range of the vehicle headlight on the basis of the obtained movement information, and a light distribution controller configured to control a light distribution state of the vehicle headlight according to the shielding range derived by the shielding range derivation part.

As a configuration example, there is provided a method of controlling a vehicle headlight for controlling a light distribution state by a vehicle headlight, the method of controlling a vehicle headlight having a step of obtaining movement information that is information showing movement of an oncoming vehicle, a step of deriving a shielding range of the vehicle headlight on the basis of the obtained movement information, and a step of controlling a light distribution state of the vehicle headlight according to the shielding range derived by the shielding range derivation part.

Second Embodiment

A schematic configuration of an automobile 1a according to an embodiment of the present invention can be applied to FIG. 1. However, a controller 31a is provided instead of the controller 31.

A front portion of the automobile 1a to which the control device according to the embodiment of the present invention is applied can be applied to FIG. 2.

[Schematic Functional Configuration of Control System of Automobile]

Figure 7:
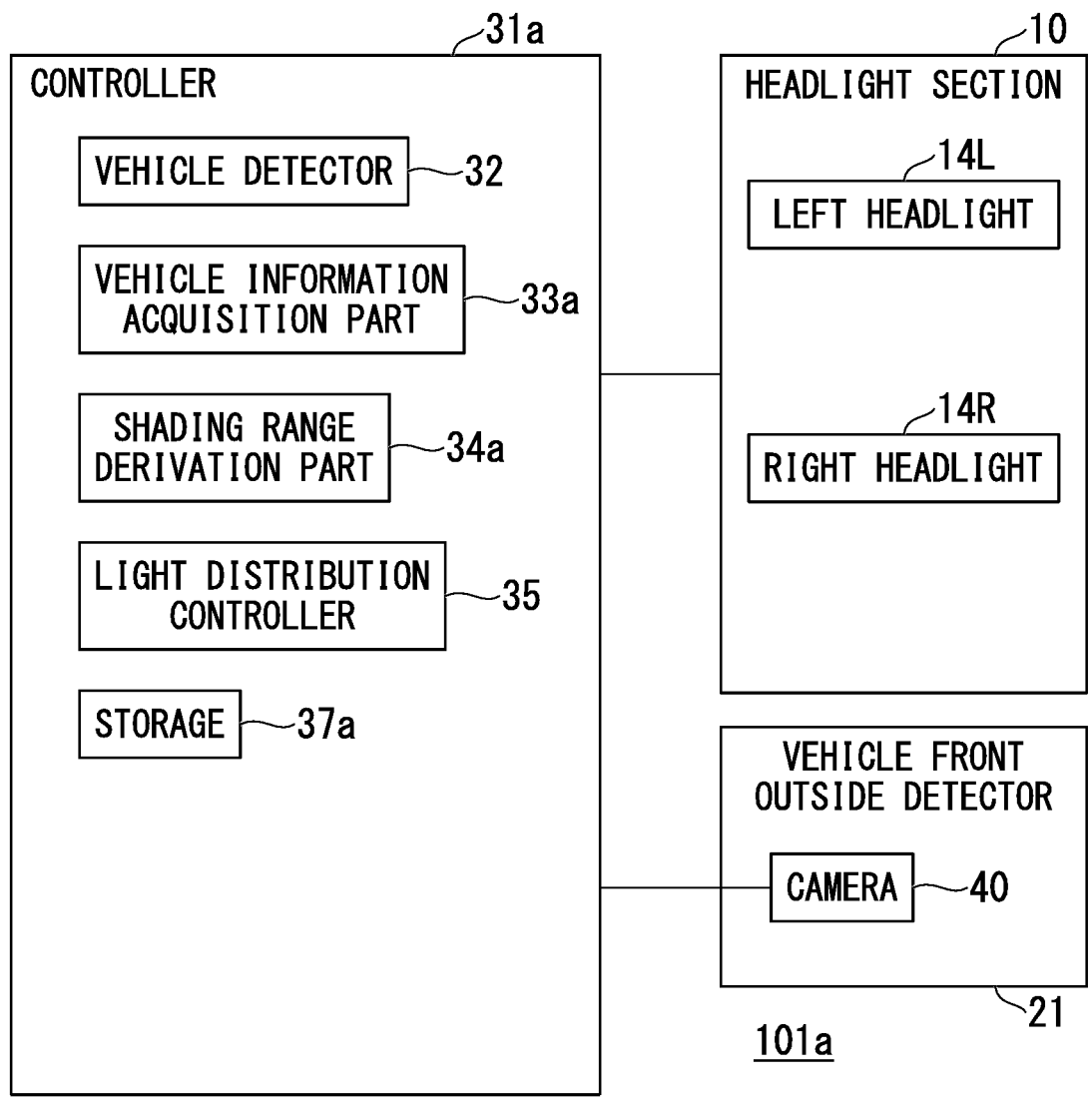
FIG. 7 is a functional block diagram showing a schematic functional configuration of the lighting system included in the automobile according to the embodiment of the present invention.

FIG. 7 is a functional block diagram showing a schematic functional configuration of a lighting system 101a included in the automobile 1a according to the embodiment of the present invention.

The lighting system 101a includes the headlight section 10, the controller 31a and the vehicle front surroundings detector 21.

Here, in the embodiment, like a concept of general "front and rear," a direction in which the automobile 1a normally advances (travels) in a direction in which a driver in the automobile 1a is conventionally directed is referred to as "front (forward)" and a direction opposite thereto is referred to as "rear (rearward)."

The controller 31a includes a vehicle detector 32, a vehicle information acquisition part 33a, a shielding range derivation part 34a, a light distribution controller 35 and a storage 37a.

The storage 37a stores information. Here, the storage 37a may store arbitrary information. As an example, the storage 37a may store information such as a control program, a control parameter, or the like, performed by the controller 31a. In this case, the controller 31a includes a processor such as a CPU or the like, and the processor executes various types of processing by executing the control program stored in the storage 37a using the control parameter stored in the storage 37a.

The vehicle detector 32 acquires information showing a speed of the automobile 1a when an oncoming vehicle is detected while detecting the oncoming vehicle on the basis of the image of the side in front of the automobile 1a periodically captured by the camera 40.

Specifically, the vehicle detector 32 detects the oncoming vehicle by recognizing the pair of points on the oncoming vehicle through image recognition processing with respect to the image. An example of the pair of points is exemplified as headlamps (the left headlight 14L and the right headlight 14R) of the oncoming vehicle. The vehicle detector 32 outputs the pair of recognition results for the oncoming vehicle and the information showing the speed of the automobile 1a to the vehicle information acquisition part 33a when the oncoming vehicle is detected. Here, an example of the pair of recognition results for the oncoming vehicle is exemplified as a pair of images for the oncoming vehicle.

The vehicle information acquisition part 33a obtains positions (relative positions) of the pair of points on the oncoming vehicle seen from the reference point on the automobile 1a on the basis of the recognition results of the pair of points on the oncoming vehicle detected by the vehicle detector 32. Here, an example of the reference point on the automobile 1a is a predetermined position on the automobile 1a (for example, in the vicinity of the interior rearview mirror).

Specifically, a case in which an angle formed between an advancing direction which passes through a center of the automobile 1a when the automobile 1a detects an oncoming vehicle and a line connecting the center of the automobile 1a and the left headlamp of the oncoming vehicle 2 is defined as an angle $\alpha$, an angle formed between the advancing direction which passes through the center of the automobile 1a and a line connecting the center of the automobile 1a and the right headlamp of the oncoming vehicle is defined as an angle $\beta$, and a speed of the automobile 1a is defined as a speed v will be described.

The vehicle information acquisition part 33 obtains the positions (the angles ($\alpha 1$, $\oplus 1$)) from the image of the side in front of the automobile 1a captured by the camera 40 when the oncoming vehicle is at a first position, and acquires the information showing the speed v1. The vehicle information acquisition part 33 outputs the information showing the obtained positions (the angles ($\alpha 1$, $\beta 1$)) and the information showing the speed v1 to the shielding range derivation part 34a.

In addition, the vehicle information acquisition part 33a obtains the positions (the angles ($\alpha 2$, $\beta 2$)) from the image of the side in front of the automobile 1 captured by the camera 40 when the oncoming vehicle is moved and disposed at a second position, and acquires information showing a speed v2. The vehicle information acquisition part 33 outputs the information showing the obtained positions (the angles ($\alpha 2$, $\beta 2$)) and the information showing the speeds (v1, v2) to the shielding range derivation part 34.

The shielding range derivation part 34a obtains a positional relation between the automobile 1a and the oncoming vehicle 2 on the basis of the information showing the position (angle) output from the vehicle information acquisition part 33a and obtains a shielding range of the vehicle headlight on the basis of the obtained positional relation.

Specifically, the shielding range derivation part 34a obtains a positional relation between the automobile 1a and the oncoming vehicle 2 on the basis of the information showing the positions (the angles ($\alpha 1$, $\beta 1$)) output from the vehicle information acquisition part 33a, and obtains a shielding range of the vehicle headlight on the basis of the obtained positional relation. In addition, the shielding range derivation part 34a obtains a positional relation between the automobile 1a and the oncoming vehicle 2 on the basis of the information showing the positions (the angles ($\alpha 2$, $\beta 2$)) output from the vehicle information acquisition part 33a, and obtains a shielding range of the vehicle headlight on the basis of the obtained positional relation.

The shielding range derivation part 34a derives the angular velocity $\omega LT2$ on a left side and the angular velocity $\omega RT2$ on a right side at the time T2 from the positions (the angles ($\alpha 1$, $\beta 1$, $\alpha 2$, $\beta 2$)) from the above-mentioned Equation (1) and Equation (2).

The shielding range derivation part 34a derives a shielding range on the basis of the angular velocity $\omega LT2$ of a left end and the angular velocity $\omega RT2$ of a right end, which have been derived. The shielding range derivation part 34a outputs the information showing the derived shielding range to the light distribution controller 35. The shielding range derivation part 34a stores the information showing the positions (angles ($\alpha 1$, $\beta 1$, $\alpha 2$, $\beta 2$)) and the information showing the speeds (v1, v2).

Figure 8:
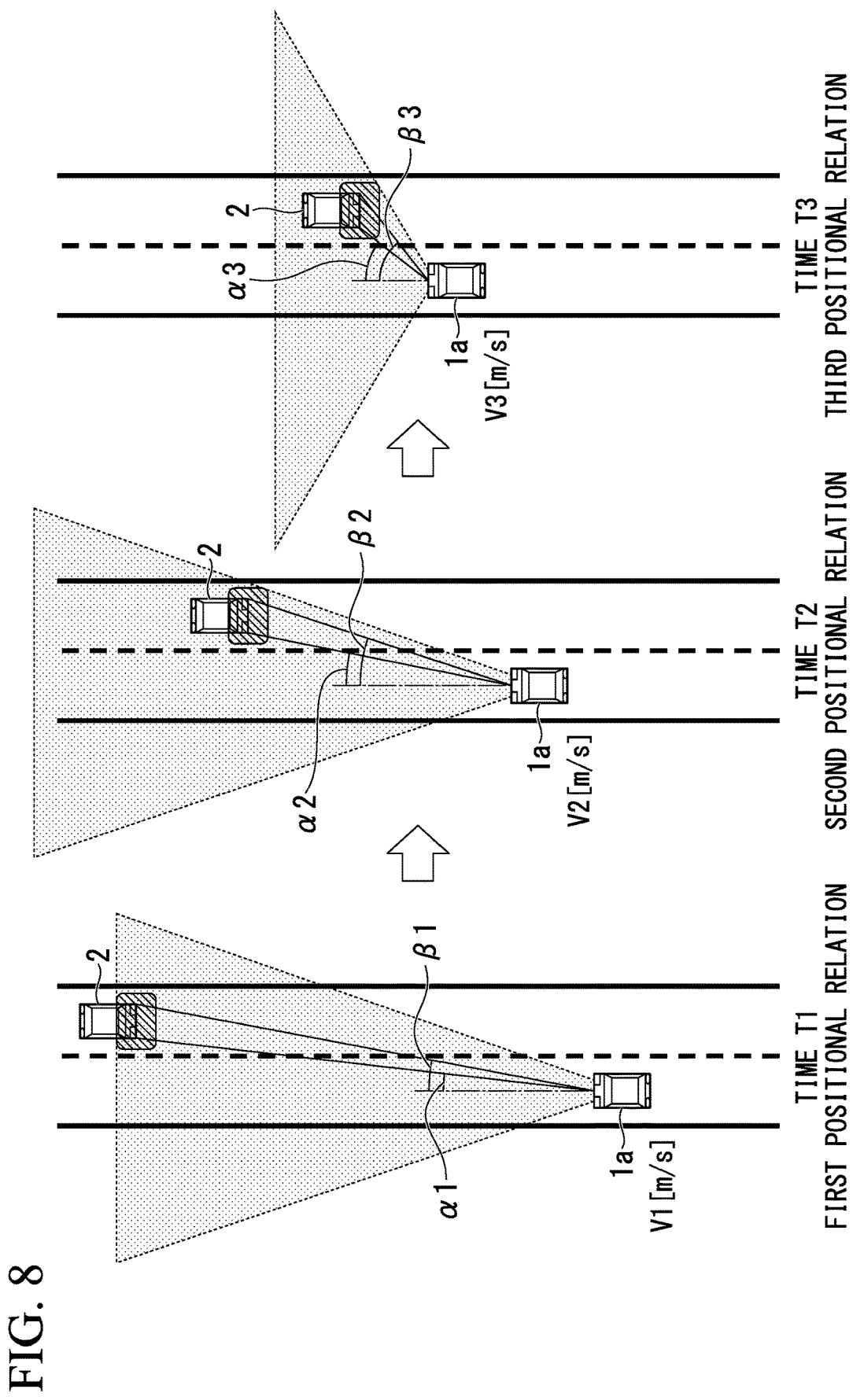
FIG. 8 is a view for explaining processing for controlling a schematic shielding range of the lighting system included in the automobile according to the embodiment of the present invention.

FIG. 8 is a view for explaining processing for controlling a schematic shielding range of the lighting system 101a included in the automobile 1a according to the embodiment of the present invention. In FIG. 8, a left side shows a positional relation between the automobile 1a and the oncoming vehicle 2 at a time T1, a middle shows a positional relation between the automobile 1a and the oncoming vehicle 2 at a time T2, and a right side shows a positional relation between the automobile 1a and the oncoming vehicle 2 at a time T3.

In the left side of FIG. 8, an angle formed between the advancing direction which passes through the center of the automobile 1a when the automobile 1a detects the oncoming vehicle 2 and a line connecting the center of the automobile 1a and the left headlamp of the oncoming vehicle 2 is defined as an angle α1, an angle formed between the advancing direction which passes through the center of the automobile 1a and a line connecting the center of the automobile 1a and the right headlamp of the oncoming vehicle 2 is defined as an angle β1, and a speed of the automobile 1a is defined as v1 [m/s].

In the middle of FIG. 8, an angle formed between the advancing direction of the automobile 1a when the automobile 1a detects the oncoming vehicle 2 and a line connecting the center of the automobile 1a and the left headlamp of the oncoming vehicle 2 is defined as an angle α2, an angle formed between the advancing direction of the automobile 1a and a line connecting the center of the automobile 1a and the right headlamp of the oncoming vehicle 2 is defined as an angle β2, and a speed of the automobile 1a is defined as v2 [m/s].

The shielding range derivation part 34a obtains a positional relation between the automobile 1a and the oncoming vehicle 2 on the basis of the information showing the positions (the angles (α1, β1)) output from vehicle information acquisition part 33a and obtains a shielding range of the vehicle headlight on the basis of the obtained positional relation at the time T1. The shielding range derivation part 34a obtains a positional relation between the automobile 1a and the oncoming vehicle 2 on the basis of the information showing the positions (the angles (α2, β2)) output from the vehicle information acquisition part 33a and obtains a shielding range of the vehicle headlight on the basis of the obtained positional relation at the time T2.

Processing performed by the shielding range derivation part 34a for the time T3 that elapsed by a predetermined time from the time T2 will be described.

Here, provided that a width of the automobile 1a is d1 and a length from the center of the automobile 1a to the right headlamp of the oncoming vehicle 2 in a direction perpendicular to a traveling direction of the automobile 1a is d2, a length from the center of the automobile 1a to the left headlamp of the oncoming vehicle 2 is represented as d1+d2.

The shielding range derivation part 34a derives a moved distance of the headlight of the oncoming vehicle 2 from Equation (5) to Equation (8).

$$\tan \alpha 1 = (\text{distance to oncoming vehicle 2})/d1 \quad (5)$$

$$\tan \beta 1 = (\text{distance to oncoming vehicle 2})/(d1+d2) \quad (6)$$

$$\tan \alpha 2 = (\text{distance to oncoming vehicle 2})/d1 \quad (7)$$

In addition, the shielding range derivation part 34a derives a distance H, to which the automobile 1a travels, from the speed v1 and the speed v2 of the automobile 1a.

Further, provided that an average of two moved distances of the headlight of the oncoming vehicle 2 is defined as a relative distance h, a distance to which the oncoming vehicle 2 moves is h−H.

The shielding range derivation part 34a derives a speed v3 of the oncoming vehicle 2 from Equation (9).

$$v3 = (h-H)/t1 \quad (9)$$

The shielding range derivation part 34a derives a relative speed between the automobile 1a and the oncoming vehicle 2 on the basis of the speed v2 and the speed v3. In the embodiment, data (a fixed number table) of a table format in which a relative speed between the automobile 1a and the oncoming vehicle 2 and the information showing the shielding range are correlated with each other is previously prepared. The shielding range derivation part 34a stores the fixed number table.

The shielding range derivation part 34a derives a shielding range by acquiring the shielding range related to the relative speed from the fixed number table on the basis of the derived relative speed between the automobile 1a and the oncoming vehicle 2.

The shielding range derivation part 34a outputs the information showing the derived shielding range to the light distribution controller 35.

[Example of Procedure of Adjustment Processing of Shielding Range]

Figure 9:
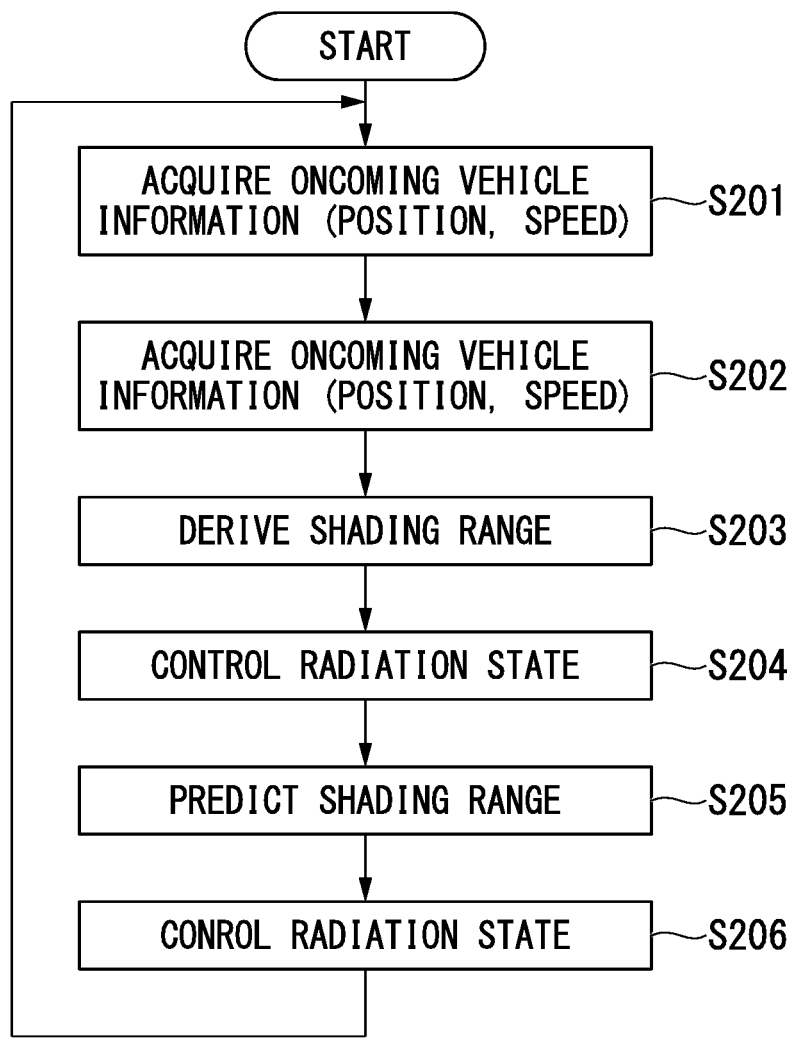
FIG. 9 is a flowchart showing an example of a procedure of processing for controlling a shielding range of the lighting system included in the automobile according to the embodiment of the present invention.

FIG. 9 is a flowchart showing an example of a procedure of processing for controlling a shielding range of the lighting system 101a included in the automobile 1a according to the embodiment of the present invention.

Figure 10:
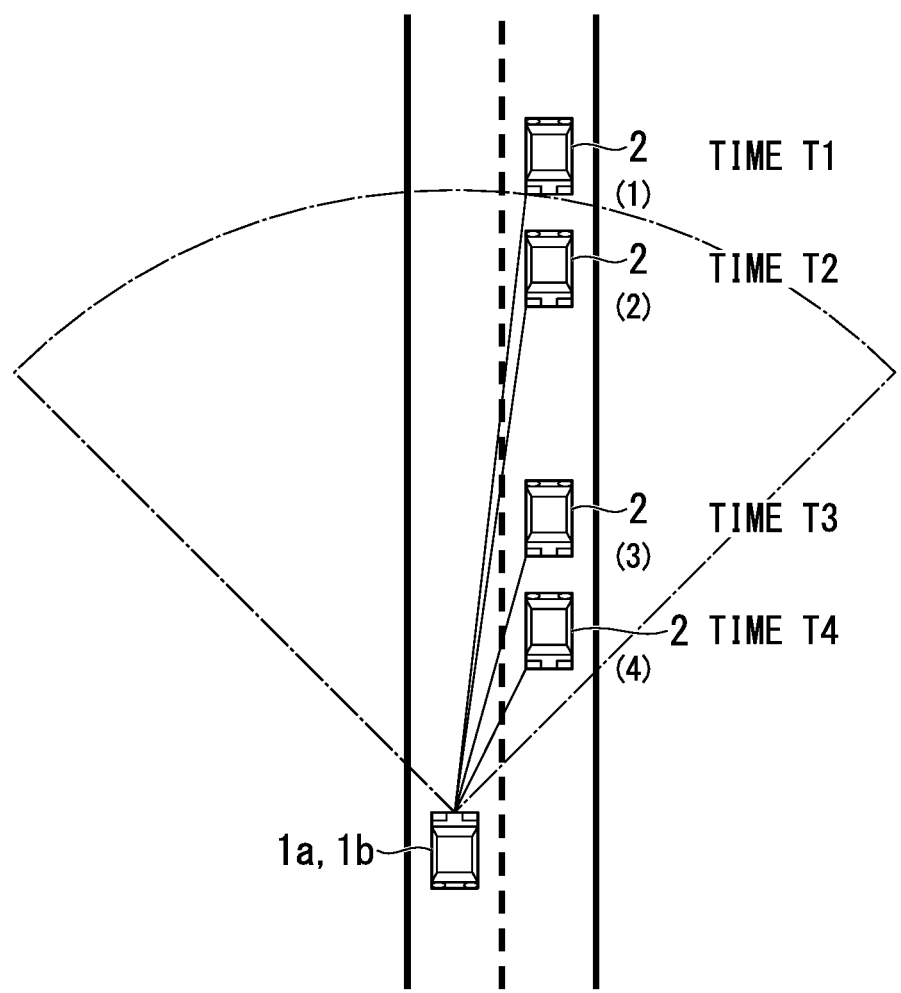
FIG. 10 is a view showing an example of a procedure of processing for controlling a schematic shielding range of the lighting system included in the automobile according to the embodiment of the present invention.

FIG. 10 is a view showing an example of a procedure of processing for controlling a schematic shielding range of the lighting system 101a included in the automobile 1a according to the embodiment of the present invention.

In the example, it is assumed that a certain person as a driver sits on a driver's seat of the automobile 1a. In the example, traveling of both of the automobile 1a and the oncoming vehicle 2 is shown by a position of the oncoming vehicle 2 with respect to the automobile 1a.

Specifically, as shown in FIG. 10, the oncoming vehicle 2 is disposed at position (1) with respect to the automobile 1a on a time T1, the oncoming vehicle 2 is disposed at position (2) with respect to the automobile 1a on a time T2, the oncoming vehicle 2 is disposed at position (3) with respect to the automobile 1a on a time T3, and the oncoming vehicle 2 is disposed at position (4) with respect to the automobile 1a on a time T4.

In the example, processing performed by the shielding range derivation part 34 at the time T3 will be mainly described.

(Step S201)

The vehicle detector 32a acquires speed information of the automobile 1a when the oncoming vehicle is detected while detecting the oncoming vehicle 2 on the basis of the image of the side in front of the automobile 1a disposed at position (1) captured by the camera 40 at the time T. The vehicle detector 32a outputs information showing a pair of recognition results for the oncoming vehicle 2 and a speed of the automobile 1a to the vehicle information acquisition part 33a when the oncoming vehicle 2 is detected.

The vehicle information acquisition part 33a obtains positions (angles) of a pair of points on the oncoming vehicle 2 seen from a reference point on the automobile 1a on the basis of recognition results of the pair of points on the oncoming vehicle 2 detected by the vehicle detector 32, and acquires information showing the speed v1 of the automobile 1a. The vehicle information acquisition part 33a outputs the information showing the positions (the angles (α1, β1)) of the pair of points on the oncoming vehicle 2 seen from the reference point on the automobile 1a and the speed (v1), which were obtained, to the shielding range derivation part 34a.

At the time T1, the shielding range derivation part 34a obtains a positional relation between the automobile 1a and the oncoming vehicle 2 on the basis of the information showing the positions (the angles ($\alpha$1, $\beta$1)) output from the vehicle information acquisition part 33a and obtains a shielding range of the vehicle headlight on the basis of the obtained positional relation. The shielding range derivation part 34a stores the information showing the positions (the angles ($\alpha$1, $\beta$1)) and the information showing the speed v1 of the automobile 1a.

(Step S202)

At the time T2, the vehicle detector 32a acquires speed information of the automobile 1a when an oncoming vehicle is detected while detecting the oncoming vehicle 2 on the basis of the image of the side in front of the automobile 1a disposed at position (2) captured by the camera 40. The vehicle detector 32a outputs the information showing the pair of recognition results for the oncoming vehicle 2 and the speed of the automobile 1a to the vehicle information acquisition part 33a when the oncoming vehicle 2 is detected.

The vehicle information acquisition part 33a obtains positions (angles) of a pair of points on the oncoming vehicle 2 seen from the reference point on the automobile 1a on the basis of recognition results of the pair of points on the oncoming vehicle 2 detected by the vehicle detector 32a, and acquires the information showing the speed v2 of the automobile 1a. The vehicle information acquisition part 33a outputs the information showing the positions (the angles ($\alpha$2, $\beta$2)) of the pair of points on the oncoming vehicle 2 seen from the reference point on the automobile 1a and the speed (v2), which were obtained, to the shielding range derivation part 34a.

(Step S203)

At the time T2, the shielding range derivation part 34a obtains a positional relation between the automobile 1a and the oncoming vehicle 2 on the basis of the information showing the positions (the angles ($\alpha$2, $\beta$2)) output from the vehicle information acquisition part 33a and obtains a shielding range of the vehicle headlight on the basis of the obtained positional relation. The shielding range derivation part 34a outputs the information showing the obtained shielding range to the light distribution controller 35. The shielding range derivation part 34a stores the information showing the positions (the angles ($\alpha$2, $\beta$2)) and the information showing the speed v2 of the automobile 1a.

(Step S204)

The light distribution controller 35 acquires the information showing the shielding range output from the shielding range derivation part 34a, and controls light radiation states of the left headlight 14L and the right headlight 14R of the headlight section 10 (the left headlight 14L and the right headlight 14R) according to the information showing the acquired shielding range.

(Step S205)

At the time T3, the shielding range derivation part 34a derives the angular velocity $\omega$LT2 of the left headlamp and the angular velocity $\omega$RT2 of the right headlamp, like the above-mentioned first embodiment, on the basis of the stored information showing the positions (angles ($\alpha$1, $\beta$1, $\alpha$2, $\beta$2)). The shielding range derivation part 34a derives a shielding range on the basis of the angular velocity $\omega$LT2 of the left headlamp and the angular velocity $\omega$RT2 of the right headlamp, which have been derived. The shielding range derivation part 34a outputs the information showing the derived shielding range to the light distribution controller 35.

Specifically, the shielding range derivation part 34a derives a moved distance of the headlight of the oncoming vehicle 2 from the above-mentioned Equation (5) to Equation (8) on the basis of the information showing the positions (the angles ($\alpha$1, $\beta$1, $\alpha$2, $\beta$2)) and the information showing the speeds (v1, v2), that were stored. The shielding range derivation part 34a derives the speed v3 of the oncoming vehicle 2 from the above-mentioned Equation (9). The shielding range derivation part 34a derives a relative speed between the automobile 1a and the oncoming vehicle 2 on the basis of the speed v2 and the speed v3. The shielding range derivation part 34a acquires a shielding range related to the relative speed from the fixed number table on the basis of the derived relative speed between the automobile 1a and the oncoming vehicle 2. The shielding range derivation part 34a outputs the information showing the acquired shielding range to the light distribution controller 35.

(Step S206)

The light distribution controller 35 acquires the information showing the shielding range output from the shielding range derivation part 34a, and controls the light radiation states of the left headlight 14L and the right headlight 14R of the headlight section 10 (the left headlight 14L and the right headlight 14R) according to the information showing the acquired shielding range.

After the processing in step S206 is terminated, the processing transitions to step S201. In step S201, processing for controlling the shielding range is performed at the time T4.

In the above-mentioned second embodiment, while the lighting system 101a has been described with respect to the case in which the processing of estimating the shielding range is performed once on the basis of the information showing the positions (angles ($\alpha$1, $\beta$1, $\alpha$2, $\beta$2)) of the pair of points on the oncoming vehicle 2 and the speeds (v1, v2), it is not limited to the example.

For example, the lighting system 101a may derive the shielding range two times or more on the basis of the information showing the positions (angles) of the pair of points on the oncoming vehicle 2 and the speed. In the example shown in FIG. 9, the case in which the shielding range derivation part 34a performs the control of the shielding range at the time T3 using the position (angle) and the speed at the time T1 and the position (angle) and the speed in time T2, and the control of the shielding range at the time T4 is performed without using the previous position (angle) and speed. However, the shielding range derivation part 34a may perform the control of the shielding range at the time T4 using the position (angle) and the speed at the time T2 and the position (angle) and the speed at the time T3.

In the above-mentioned second embodiment, while the case in which the shielding range derivation part 34a controls the shielding range on the basis of the image of the side in front of the automobile 1 captured by the camera 40 has been described, there is no limitation thereto. For example, radar configured to detect an oncoming vehicle may be provided in the automobile 1a, and the shielding range derivation part 34 may detect vehicle information using information output from the radar.

In the above-mentioned second embodiment, while the case in which the shielding range of the oncoming vehicle is controlled has been described, it is not limited to the example. For example, the embodiment is not limited to the oncoming vehicle and may be applied to a preceding vehicle that travels along the same lane or a neighboring lane. In addition, for example, the embodiment may be applied to a following vehicle. In such a case, a vehicle surroundings detector configured to detect those directions is provided.

According to the lighting system 101a of the above-mentioned second embodiment, the angular velocity at the time T2 is derived on the basis of the vehicle information such as the position (angle), the speed, or the like, of the oncoming vehicle disposed at position (1) at the time T1 and the vehicle information such as the position (angle), the speed, or the like, of the oncoming vehicle disposed at position (2) at the time T2. The lighting system 101a derives the shielding range of the next time (the time T3) to which a predetermined time elapses on the basis of the vehicle information acquired at the time T1 and the vehicle information acquired at the time T2.

According to the above-mentioned configuration, an angular velocity can be obtained from the vehicle information when the oncoming vehicle is detected, the obtained angular velocity, the stored vehicle information, and a vehicle body speed of the host vehicle can be reflected in the positioning control of the shielding range, and thus, a position of the shielding range can be moved. The shielding range can be derived without using the image of the side in front of the automobile 1a captured by the camera 40.

After the side in front of the automobile 1a is captured by the camera 40, since a time required until light is blocked such that the light does not reach an object to be shielded can be reduced, a situation in which when the light is blocked, there is no object at the detection position, and the object is present in a range which the light reaches can be suppressed. A light distribution that does not give glare to the oncoming vehicle is formed in consideration of a delay due to a communication speed with the camera and an image processing speed, and it can contribute to safety without damaging a field of vision of the driver in the oncoming vehicle.

When a communication period between the camera 40 and the controller 31a is assumed as a maximum tpa [s], as the image obtained through photographing by the camera 40 is not used, i.e., as the shielding range is estimated (derived) on the basis of the angle or angular velocity, or speed which is previously obtained, since a time required for communication between the camera 40 and the controller 31a can be reduced, the maximum tpa [s] can be reduced. That is, the movement information (the angular velocity, the speed) is calculated from positions of the oncoming vehicle, which are detected a plurality of times, and a time for deriving the shielding range of the vehicle headlight on the basis of the obtained movement information is shorter than an interval of detection of the position on the oncoming vehicle.

Configuration Example

As a configuration example, there is provided a controlling device for a vehicle headlight (in the example, the controller 31a of the lighting system 101a) configured to control a light distribution state by a vehicle headlight (in the embodiment, the headlight section 10 (the left headlight 14L and the right headlight 14R), the controlling device for a vehicle headlight (in the example, the controller 31a of the lighting system 101a) including a shielding range derivation part (in the example, the shielding range derivation part 34a) configured to obtain movement information (in the example, the angle, the angular velocity and the speed) that is information showing movement of the oncoming vehicle and derive a shielding range of the vehicle headlight on the basis of the obtained movement information, and a light distribution controller (in the example, the light distribution controller 35) configured to control a light distribution state of the vehicle headlight according to the shielding range derived by the shielding range derivation part.

As a configuration example, in the controlling device for a vehicle headlight, movement information is calculated from positions of an oncoming vehicle that are detected a plurality of times, and a time for deriving a shielding range of the vehicle headlight on the basis of the obtained movement information is shorter than in an interval of detection of the position on the oncoming vehicle.

As a configuration example, in the controlling device for a vehicle headlight, a vehicle information acquisition part (in the example, the vehicle information acquisition part 33a) configured to obtain an angle formed between an advancing direction of a host vehicle and a line connecting the host vehicle and the oncoming vehicle on the basis of an image of a side in front of the host vehicle captured by a camera is provided, and the shielding range derivation part obtains movement information from the information showing the angle acquired by the vehicle information acquisition part.

As a configuration example, in the controlling device for a vehicle headlight, the vehicle information acquisition part further acquires information showing the speed of the host vehicle, and the shielding range derivation part derives a shielding range on the basis of the information showing the angle acquired by the vehicle information acquisition part and the information showing the speed of the host vehicle.

As a configuration example, in the controlling device for a vehicle headlight, the movement information is an angular velocity.

As a configuration example, in the controlling device for a vehicle headlight, the shielding range derivation part stores a fixed number table in which a relative speed of an oncoming vehicle with respect to a host vehicle and a shielding range are correlated to each other, derives a relative speed of the oncoming vehicle with respect to the host vehicle on the basis of the information showing the angle acquired by the vehicle information acquisition part and the information showing the speed of the host vehicle, and acquires a shielding range correlated to the derived relative speed.

Third Embodiment

A schematic configuration of an automobile 1b according to an embodiment of the present invention can be applied to FIG. 1. However, a controller 31b is provided instead of the controller 31.

A front portion of the automobile 1b to which a control device according to the embodiment of the present invention is applied can be applied to FIG. 2.

A lighting system 101b according to the embodiment employs a configuration which is shown in the first embodiment or in the second embodiment depending on a speed of the automobile 1b.

[Schematic Functional Configuration of Control System of Automobile]

Figure 11:
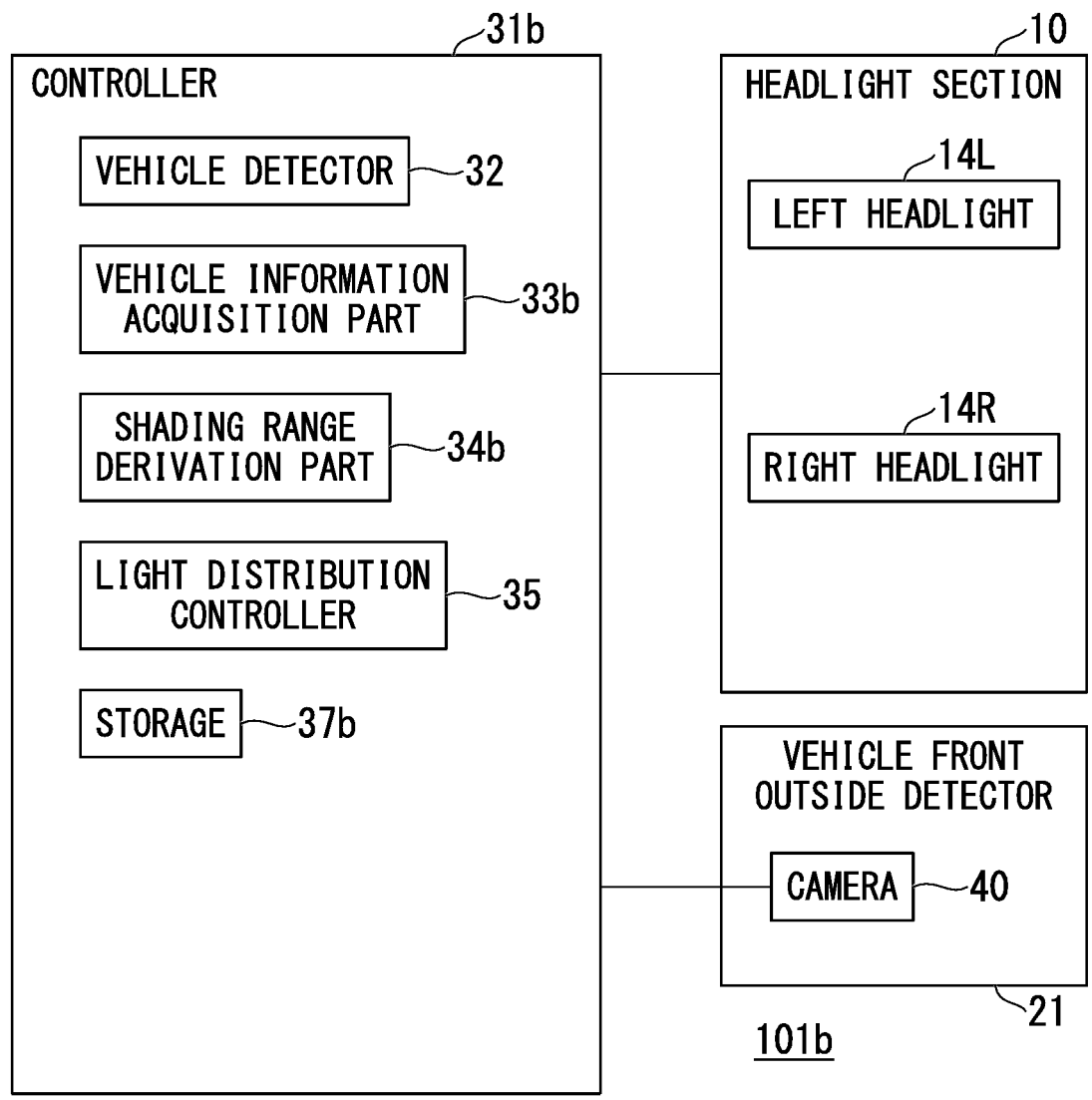
FIG. 11 is a functional block diagram showing a schematic functional configuration of the lighting system included in the automobile according to the embodiment of the present invention.

FIG. 11 is a functional block diagram showing a schematic functional configuration of the lighting system 101b included in the automobile 1b according to the embodiment of the present invention.

The lighting system 101b includes a headlight section 10, a controller 31b and a vehicle front surroundings detector 21.

Here, in the embodiment, like a concept of general "front and rear," a direction in which the automobile 1b normally advances (travels) in a direction in which a driver in the automobile 1b is conventionally directed is referred to as "front (forward)" and a direction opposite thereto is referred to as "rear (rearward)."

The controller 31b includes a vehicle detector 32, a vehicle information acquisition part 33b, a shielding range derivation part 34b, a light distribution controller 35 and a storage 37b.

The storage 37b stores information. Here, the storage 37b may store arbitrary information. As an example, the storage 37b may store information such as a control program, a control parameter, or the like, performed by the controller 31b. In this case, the controller 31b includes a processor such as a CPU or the like, and the processor executes various types of processing by executing the control program stored in the storage 37b using the control parameter stored in the storage 37b.

The vehicle detector 32 acquires speed information of the automobile 1b when an oncoming vehicle is detected while detecting the oncoming vehicle on the basis of an image of a side in front of the automobile 1b periodically captured by the camera 40. Specifically, the vehicle detector 32 detects an oncoming vehicle by recognizing a pair of points on the oncoming vehicle by performing image recognition processing with respect to the image. An example of the pair of points is the headlamp (the left headlight 14L and the right headlight 14R) of the oncoming vehicle.

The vehicle detector 32 outputs information showing a pair of recognition results for the oncoming vehicle and a speed of the automobile 1b to the vehicle information acquisition part 33b when the oncoming vehicle is detected. Here, an example of the pair of recognition results of the oncoming vehicle is exemplified as a pair of images for the oncoming vehicle.

The vehicle information acquisition part 33b obtains positions (relative positions) of the pair of points on the oncoming vehicle seen from the reference point on the automobile 1b on the basis of the recognition results of the pair of points on the oncoming vehicle detected by the vehicle detector 32. Here, an example of the reference point on the automobile 1b is a predetermined position (for example, in the vicinity of an interior rearview mirror) of the automobile 1b.

Specifically, a case in which an angle formed between an advancing direction which passes through a center of the automobile 1b when the automobile 1b detects an oncoming vehicle and a line connecting the center of the automobile 1 and a left headlamp of the oncoming vehicle 2 is defined as an angle $\alpha$, an angle formed between the center of the automobile 1b and a line connecting the center of the automobile 1 and a right headlamp of the oncoming vehicle is defined as an angle $\beta$, and a speed of the automobile 1b is a speed v will be described.

The vehicle information acquisition part 33b obtains positions (angles ($\alpha 1$, $\beta 1$)) obtained from an image of a side in front of the automobile 1b captured by the camera 40 when an oncoming vehicle is disposed at a first position, and acquires the information showing the speed v1. The vehicle information acquisition part 33b outputs the information showing the obtained positions (the angles ($\alpha 1$, $\beta 1$)) and the information showing the speed v1 to the shielding range derivation part 34b.

In addition, the vehicle information acquisition part 33b obtains the position (the angles ($\alpha 2$, $\beta 2$)) from the image on the side in front of the automobile 1 captured by the camera 40 when the oncoming vehicle has moved to a second position, and acquires the information showing the speed v2. The vehicle information acquisition part 33 outputs the information showing the obtained positions (the angles ($\alpha 2$, $\beta 2$)) and the information showing the speeds (v1, v2) to the shielding range derivation part 34b.

The shielding range derivation part 34b obtains a positional relation between the automobile 1b and the oncoming vehicle 2 on the basis of the information showing the position (angle) output from the vehicle information acquisition part 33b and obtains a shielding range of the vehicle headlight on the basis of the obtained positional relation.

Specifically, the shielding range derivation part 34b obtains a positional relation between the automobile 1 and the oncoming vehicle 2 on the basis of the information showing the positions (the angles ($\alpha 1$, $\beta 1$)) output from the vehicle information acquisition part 33b and obtains a shielding range of the vehicle headlight on the basis of the obtained positional relation. In addition, the shielding range derivation part 34b obtains a positional relation between the automobile 1b and the oncoming vehicle 2 on the basis of the information showing the positions (the angles ($\alpha 2$, $\beta 2$)) output from the vehicle information acquisition part 33b and obtains a shielding range of the vehicle headlight on the basis of the obtained positional relation.

In addition, the shielding range derivation part 34b determines whether the speed (v2) in the information showing the speeds (v1, v2) output from the vehicle information acquisition part 33b is less than a predetermined threshold or is equal to the predetermined threshold or more. When the speed (v2) is less than the threshold, the shielding range derivation part 34b performs processing according to the above-mentioned first embodiment. In this case, the shielding range derivation part 34b stores an angle $\alpha 3$ of a left headlamp and an angle $\beta 3$ of a right headlamp, which have been derived. In addition, the shielding range derivation part 34b derives a shielding range on the basis of the angle $\alpha 3$ of the left headlamp and the angle $\beta 3$ of the right headlamp, which have been derived. The shielding range derivation part 34b outputs the information showing the derived shielding range to the light distribution controller 35.

Meanwhile, when the speed (v2) is the threshold or more, the shielding range derivation part 34b performs the processing according to the above-mentioned second embodiment. In this case, the shielding range derivation part 34b derives a shielding range on the basis of an angular velocity $\omega LT2$ of a left end and an angular velocity $\omega RT2$ of a right end, which have been derived. The shielding range derivation part 34b outputs the information showing the derived shielding range to the light distribution controller 35. The shielding range derivation part 34b stores the information showing the positions (the angles ($\alpha 1$, $\beta 1$, $\alpha 2$, $\beta 2$)) and the information showing the speeds (v1, v2).

The shielding range derivation part 34b stores the information showing the angular velocity $\omega LT2$ of the left headlamp and the information showing the angular velocity $\omega RT2$ of the right headlamp, which have been derived.

Here, description will be continued while assuming that a time required for processing of software is t2 seconds. The shielding range derivation part 34b derives an angle $\alpha 3$ of the left headlamp and an angle $\beta 3$ of the right headlamp at a time T3 from the above-mentioned Equation (3) and Equation (4) using the information showing the angular velocity $\omega LT2$ of the left headlamp and the information showing the angular velocity $\omega RT2$ of the right headlamp, which are stored.

The shielding range derivation part 34b stores the information showing the angle $\alpha 3$ of the left headlamp and the information showing the angle $\beta 3$ of the right headlamp, where were derived.

In addition, the shielding range derivation part 34*b* derives a shielding range on the basis of the angle α3 of the left headlamp and the angle β3 of the right headlamp, which have been derived. The shielding range derivation part 34*b* outputs the information showing the derived shielding range to the light distribution controller 35.

Meanwhile, when the shielding range derivation part 34*b* acquires the information showing the position (the angles (β1, β1, α2, β2)) output from the shielding range derivation part 34*b* and the information showing the speeds (v1, v2), the shielding range derivation part 34*b* stores the acquired information showing the positions (the angles (α1, β1, α2, β2)) and the information showing the speeds (v1, v2).

The shielding range derivation part 34*b* derives a moved distance of the headlight of the oncoming vehicle 2 from the above-mentioned Equation (5) to Equation (8). The shielding range derivation part 34*b* derives a distance H in which the automobile 1*b* has traveled from the speed v1 and the speed v2 of the automobile 1*b*. The shielding range derivation part 34*b* derives a speed v3 of the oncoming vehicle 2 from the above-mentioned Equation (9). The shielding range derivation part 34*b* derives a relative speed between the automobile 1*b* and the oncoming vehicle 2 on the basis of the speed v2 and the speed v3. The shielding range derivation part 34*b* derives a shielding range by acquiring the shielding range related to the relative speed from the fixed number table on the basis of the derived relative speed between the automobile 1*b* and the oncoming vehicle 2.

The shielding range derivation part 34*b* outputs the information showing the derived shielding range to the light distribution controller 35.

[Example of Procedure of Adjustment Processing of Shielding Range]

Figure 12:
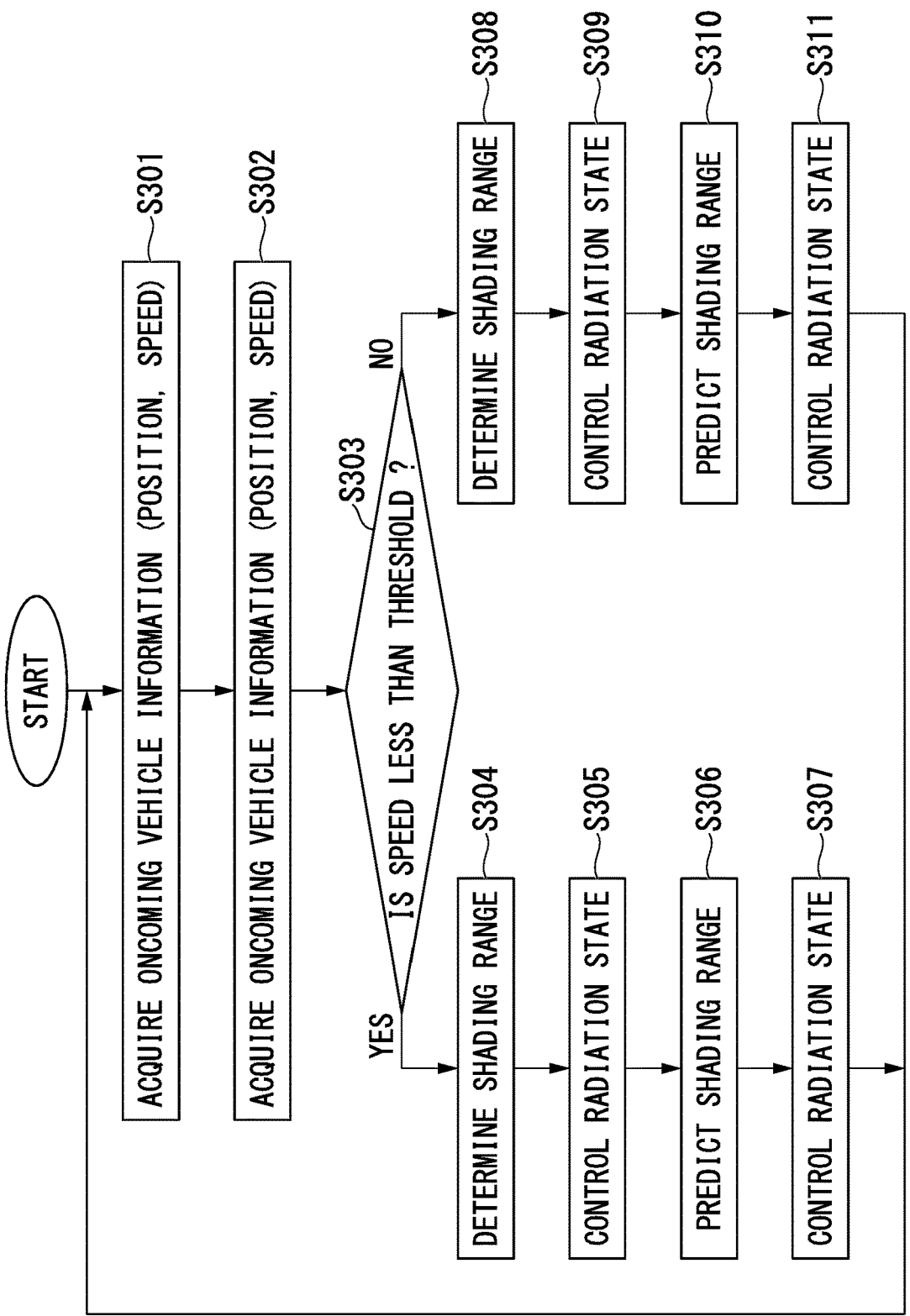
FIG. 12 is a flowchart showing an example of a procedure of processing for controlling a shielding range of the lighting system included in the automobile according to the embodiment of the present invention.

FIG. 12 is a flowchart showing an example of a procedure of processing for controlling a shielding range of the lighting system 101*b* included in the automobile 1*b* according to the embodiment of the present invention.

An example of the procedure of the processing for controlling the shielding range of the lighting system 101*b* according to the embodiment of the present invention can be applied to FIG. 10.

In the example, it is assumed that a certain person as a driver sits on a driver's seat in the automobile 1*b*. In the example, traveling of both of the automobile 1*b* and the oncoming vehicle 2 is shown at a position on the oncoming vehicle 2 with respect to the automobile 1*b*.

Specifically, as shown in FIG. 10, the oncoming vehicle 2 is disposed at position (1) with respect to the automobile 1*b* at the time T1, the oncoming vehicle 2 is disposed at position (2) with respect to the automobile 1*b* at the time T2, the oncoming vehicle 2 is disposed at position (3) with respect to the automobile 1*b* at the time T3, and the oncoming vehicle 2 is disposed at position (4) with respect to the automobile 1*b* at the time T4.

For Steps S301 to S302, steps S201 to S202 in FIG. 9 can be applied.

(Step S303)

The shielding range derivation part 34*b* determines whether the speed (v2) is less than the predetermined threshold or is equal to the predetermined threshold or more on the basis of the information showing the speeds (v1, v2) output from the vehicle information acquisition part 33*b*.

When the speed (v2) is less than the predetermined threshold, the processing transitions to step S304. When the speed (v2) is equal to the predetermined threshold or more, the processing transitions to step S308.

For Steps S304 to S307, steps S103 to S106 in FIG. 5 can be applied.

For Steps S308 to S311, steps S203 to S206 in FIG. 9 can be applied.

In the above-mentioned third embodiment, while the case in which the shielding range of the oncoming vehicle is controlled has been described, there is no limitation thereto. For example, the embodiment is not limited to the oncoming vehicle and may be applied to a preceding vehicle that travels in the same lane or a neighboring lane. In addition, for example, the embodiment may be applied to a following vehicle. In such a case, a vehicle surroundings detector configured to detect those directions is provided.

According to the lighting system 101*b* of the above-mentioned third embodiment, control of the shielding range described in the first embodiment and the control described in the second embodiment are distinguished according to the speed of the automobile 1*b*. According to the above-mentioned configuration, when the speed of the automobile 1*b* is low, the shielding range is controlled on the basis of the angular velocity showing movement of the oncoming vehicle, and when the speed of the automobile 1*b* is high, the shielding range is controlled on the basis of a relative speed with respect to the oncoming vehicle.

According to the above-mentioned configuration, the shielding range can be derived without using the image of the side in front of the automobile 1*b* captured by the camera 40. After the side in front of the automobile 1*a* is captured by the camera 40, since a time required until light is blocked such that the light does not reach an object to be shielded can be reduced, a situation in which when the light is blocked, there is no object at the detection position, and the object is present in a range which the light reaches can be suppressed. A light distribution that does not give glare to the oncoming vehicle is formed in consideration of a delay due to a communication speed with the camera and an image processing speed, and it can contribute to safety without damaging a field of vision of the driver in the oncoming vehicle.

Configuration Example

As a configuration example, there is provided a controlling device for a vehicle headlight (in the example, the controller 31*b* of the lighting system 101*b*) configured to control a light distribution state by a vehicle headlight (in the embodiment, the headlight section 10 (the left headlight 14L and the right headlight 14R), the controlling device for a vehicle headlight (in the example, the controller 31*b* of the lighting system 101*b*) including a shielding range derivation part (in the example, the shielding range derivation part 34*b*) configured to obtain movement information (in the example, an angle, an angular velocity, a speed) that is information showing movement of an oncoming vehicle and derive a shielding range of the vehicle headlight on the basis of the obtained movement information, and a light distribution controller configured to control a light distribution state of the vehicle headlight according to the shielding range derived by shielding range derivation part.

As a configuration example, in the controlling device for a vehicle headlight, the movement information is calculated from positions of the oncoming vehicle that are detected a plurality of times, and a time for deriving a shielding range of the vehicle headlight on the basis of the obtained movement information is shorter than an interval of detection of the position on the oncoming vehicle.

As a configuration example, in the controlling device for a vehicle headlight, a vehicle information acquisition part (in the example, the vehicle information acquisition part 33b) configured to acquire an angle formed between an advancing direction of a host vehicle and a line connecting the host vehicle and an oncoming vehicle and information showing a speed of the host vehicle on the basis of the image of the side in front of the host vehicle captured by a camera is provided.

The shielding range derivation part obtains movement information from the information showing the angle acquired by the vehicle information acquisition part, derives a shielding range on the basis of the movement information when the speed of the host vehicle is less than a predetermined threshold, and derives a shielding range on the basis of the information showing the angle acquired by the vehicle information acquisition part and the information showing the speed of the host vehicle when the speed of the host vehicle is equal to the predetermined threshold or more.

Processing may be performed by recording a program for realizing a function of an apparatus (for example, the controller 31, 31a, 31b, or the like) according to the above-mentioned embodiment is recorded on a computer-readable recording medium, and reading and performing the program recorded on the recording medium using a computer system.

Further, "the computer system" may include an operating system (OS) or hardware such as peripheral devices or the like.

In addition, "the computer-readable recording medium" is referred to as a writable non-volatile memory such as a flexible disk, a magneto-optical disk, a read only memory (ROM), a flash memory, or the like, a portable storage medium such as a digital versatile disk (DVD) or the like, or a storage device such as a hard disk or the like installed in the computer system.

Further, "the computer-readable recording medium" includes a medium of holding a program for a certain time, such as a volatile memory (for example, a dynamic random access memory (DRAM)) in a computer system that is a server or a client when a program is transmitted via a network such as the Internet or the like, or a communication line such as a telephone line or the like.

In addition, the program may be transmitted to another computer system from a computer system in which the program is stored in a storage device or the like via a transmission medium or transmitted waves in the transmission medium. Here, "the transmission medium" of transmitting a program is referred to as a medium having a function of transmitting information, for example, a network (a communication network) such as the Internet or the like, or a communication line such as a telephone line or the like.

In addition, the program may realize a part of the above-mentioned function. Further, the program may be a so-called differential file (a differential program) that can realize the above-mentioned function through combination with a program that is previously stored in the computer system.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A controlling device for a vehicle headlight that controls a light distribution state by the vehicle headlight, the controlling device comprising:

a shielding range derivation part that obtains an angular velocity of an oncoming vehicle which is calculated from positions of the oncoming vehicle that are detected a plurality of times and that derives a shielding range of the vehicle headlight on the basis of the obtained angular velocity;

a light distribution controller that controls the light distribution state of the vehicle headlight according to the shielding range derived by the shielding range derivation part; and a vehicle information acquisition part configured to acquire information showing an angle formed between an advancing direction of a host vehicle and a line connecting the host vehicle and the oncoming vehicle and a speed of the host vehicle on the basis of an image of a side in front of the host vehicle captured by a camera, wherein the shielding range derivation part is configured to obtain the angular velocity from the information showing the angle acquired by the vehicle information acquisition part, is configured to derive a shielding range on the basis of the angular velocity when the speed of the host vehicle is less than a predetermined threshold, and configured to derive a shielding range on the basis of the information showing the angle acquired by the vehicle information acquisition part and the information showing the speed of the host vehicle when the speed of the host vehicle is equal to the predetermined threshold or more.

2. The controlling device for a vehicle headlight according to claim 1,
wherein
a time for deriving the shielding range of the vehicle headlight on the basis of the obtained angular velocity is shorter than an interval of detections of the positions of the oncoming vehicle.

3. The controlling device for a vehicle headlight according to claim 1,
wherein the shielding range derivation part stores a fixed number table in which a relative speed of the oncoming vehicle with respect to the host vehicle and a shielding range are correlated with each other, derives a relative speed of the oncoming vehicle with respect to the host vehicle on the basis of the information showing the angle acquired by the vehicle information acquisition part and the information showing the speed of the host vehicle, and acquires a shielding range correlated to the derived relative speed.

4. A vehicle headlight comprising:

a shielding range derivation part that obtains an angular velocity of an oncoming vehicle which is calculated from positions of the oncoming vehicle that are detected a plurality of times and that derives a shielding range of the vehicle headlight on the basis of the obtained angular velocity;

a light distribution controller that controls the light distribution state of the vehicle headlight according to the shielding range derived by the shielding range derivation part; and a vehicle information acquisition part configured to acquire information showing an angle formed between an advancing direction of a host vehicle and a line connecting the host vehicle and the oncoming vehicle and a speed of the host vehicle on the basis of an image of a side in front of the host vehicle captured by a camera, wherein the shielding range derivation part is configured to obtain the angular velocity from the information showing the angle acquired by the vehicle information acquisition part, is configured to derive a shielding range on the basis of the angular velocity when the speed of the host vehicle is less than a predetermined threshold, and configured to derive a shielding range on the basis of the information showing the angle acquired by the vehicle information acquisition part and the information showing the speed of the host vehicle when the speed of the host vehicle is equal to the predetermined threshold or more.

5. A method of controlling a vehicle headlight that controls a light distribution state by the vehicle headlight, the method comprising:
   obtaining angular velocity of an oncoming vehicle which is calculated from positions of the oncoming vehicle that are detected a plurality of times;
   deriving a shielding range of the vehicle headlight on the basis of the obtained angular velocity;
   controlling the light distribution state of the vehicle headlight according to the shielding range derived through the step of deriving the shielding range; and
   using a vehicle information acquisition part to acquire information showing an angle formed between an advancing direction of a host vehicle and a line connecting the host vehicle and the oncoming vehicle and a speed of the host vehicle on the basis of an image of a side in front of the host vehicle captured by a camera,
   wherein deriving the shielding range includes obtaining the angular velocity the information showing the angle acquired by the vehicle information acquisition part, and deriving a shielding range on the basis of the angular velocity the speed of the host vehicle is less than a predetermined threshold, and deriving a shielding range on the basis of the information showing the angle acquired by the vehicle information acquisition part and the information showing the speed of the host vehicle when the speed of the host vehicle is equal to the predetermined threshold or more.

* * * * *